US012700534B2

(12) United States Patent
Yoshioka et al.

(10) Patent No.: US 12,700,534 B2
(45) Date of Patent: Aug. 4, 2026

(54) INDUCTOR COMPONENT AND MANUFACTURING METHOD THEREOF

(71) Applicant: Murata Manufacturing Co., Ltd., Kyoto-fu (JP)

(72) Inventors: Yoshimasa Yoshioka, Nagaokakyo (JP); Ryo Kudou, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 1106 days.

(21) Appl. No.: 17/825,801

(22) Filed: May 26, 2022

(65) Prior Publication Data

US 2022/0384091 A1 Dec. 1, 2022

(30) Foreign Application Priority Data

Jun. 1, 2021 (JP) ................................ 2021-092465

(51) Int. Cl.

*H01F 27/29* (2006.01)
*H01F 17/00* (2006.01)
*H01F 17/04* (2006.01)
*H01F 27/28* (2006.01)
(Continued)

(52) U.S. Cl.

CPC ....... *H01F 27/292* (2013.01); *H01F 17/0013* (2013.01); *H01F 17/04* (2013.01); *H01F 27/2866* (2013.01); *H01F 27/324* (2013.01); *H01F 41/041* (2013.01); *H01F 2017/0066* (2013.01); *H01F 2017/048* (2013.01)

(58) Field of Classification Search

CPC .... H01F 27/292; H01F 17/0013; H01F 17/04; H01F 22/2866; H01F 27/324; H01F 2017/0066; H01F 2017/048
USPC ........................................................... 336/83
See application file for complete search history.

(56) References Cited

U.S. PATENT DOCUMENTS 7,821,371 B2 * 10/2010 Inoue .................. H01F 17/0006 336/200
11,948,720 B2 * 4/2024 Furukawa ............... H01F 17/04
12,125,621 B2 * 10/2024 Okumura .................. H01F 1/24
(Continued)

FOREIGN PATENT DOCUMENTS

CN 110729112 A 1/2020
CN 112103028 A 12/2020
(Continued)

*Primary Examiner* — Shawki S Ismail
*Assistant Examiner* — Joselito S. Baisa
(74) *Attorney, Agent, or Firm* — Studebaker Brackett PLLC

(57) ABSTRACT

An inductor component comprising a base body including first and second magnetic layers laminated in order along a first direction; and an inductor wire between the first and second magnetic layers and on a plane that is orthogonal to the first direction. The first magnetic layer is in a reverse direction to the first direction of the inductor wire, the second magnetic layer is in the first direction of the inductor wire and in a direction that is orthogonal to the first direction, and when a main surface of the second magnetic layer is viewed from a direction which is orthogonal to the main surface of the second magnetic layer in the first direction, the second magnetic layer includes a dark region corresponding to the inductor wire and a bright region whose brightness is higher than that of the dark region.

19 Claims, 17 Drawing Sheets

(51) Int. Cl.
*H01F 27/32* (2006.01)
*H01F 41/04* (2006.01)

(56) References Cited

U.S. PATENT DOCUMENTS

| | | | | |
|---|---|---|---|---|
| 12,255,005 | B2 * | 3/2025 | Furukawa | H01F 27/255 |
| 2009/0002117 | A1 * | 1/2009 | Kawarai | H01F 17/0006 336/233 |
| 2009/0045905 | A1 * | 2/2009 | Nakagawa | H01F 17/0006 336/232 |
| 2014/0247101 | A1 * | 9/2014 | Cha | H01F 41/12 336/198 |
| 2018/0166194 | A1 | 6/2018 | Choi | |
| 2022/0028599 | A1 * | 1/2022 | Furukawa | H01F 27/2823 |
| 2022/0165465 | A1 * | 5/2022 | Okumura | H01F 1/24 |
| 2022/0165483 | A1 * | 5/2022 | Okumura | H01F 1/26 |
| 2022/0285072 | A1 * | 9/2022 | Furukawa | H01F 27/255 |

FOREIGN PATENT DOCUMENTS

| | | | |
|---|---|---|---|
| JP | 2016-122836 | A | 7/2016 |
| JP | 2019-140202 | A | 8/2019 |
| JP | 2020-013854 | A | 1/2020 |
| JP | 2020-150065 | A | 9/2020 |
| JP | 2020-205341 | A | 12/2020 |
| WO | 2020/183993 | A1 | 9/2020 |

* cited by examiner

INDUCTOR COMPONENT AND MANUFACTURING METHOD THEREOF

CROSS REFERENCE TO RELATED APPLICATION

This application claims benefit of priority to Japanese Patent Application 2021-092465, filed Jun. 1, 2021, the entire content of which is incorporated herein by reference.

BACKGROUND

Technical Field

The present disclosure relates to an inductor component and a manufacturing method thereof.

Background Art

An inductor component described in JP-A-2016-122836 and an inductor component described in JP-A-2019-140202 have traditionally been present.

The inductor component described in JP-A-2016-122836 includes an inductor wire, a first magnetic main body having the inductor wire embedded therein, and a second magnetic main body disposed on upper and lower portions of the first magnetic main body. The first magnetic main body contains magnetic powder particles each having a substantially spherical shape. The second magnetic main body contains a metal magnetic plate.

The inductor component described in JP-A-2019-140202 includes an inductor wire, a first magnetic main body having the inductor wire embedded therein, and a second magnetic main body disposed on upper and lower portions of the first magnetic main body. The first magnetic main body contains magnetic powder particles each having a substantially spherical shape. The second magnetic main body contains magnetic powder particles each having a flattened shape.

SUMMARY

In the above traditional inductor components, the magnetic powder particles each having a substantially spherical shape are used for the first magnetic main body that has the inductor wire embedded therein. The first magnetic main body therefore has low magnetic permeability and the inductance acquisition efficiency is insufficient compared to that of the second magnetic main body containing the metal magnetic plate or the flattened magnetic powder particles.

The reason why the spherically shaped magnetic powder particles are used for the first magnetic main body covering the inductor wire is that no ball bearing effect and the like cannot be acquired with the magnetic powder particles each having a non-spherical shape like the flattened shape and that it is therefore difficult to sufficiently fill the periphery of the inductor wire with the magnetic powder particles.

In the case where the filling with the magnetic powder particles is insufficient, it turns out that no desired inductance is acquired at an electric property sorting step after the manufacture of the inductor component, or after the mounting of the inductor component, and the insufficient filling with the magnetic powder particles is first detected at this time. When the defective filling with the magnetic powder particles is detected after the manufacture of the inductor component as above, the manufacturing loss of the product becomes significant.

Accordingly, the present disclosure provides an inductor component and a manufacturing method thereof, that can improve the inductance acquisition efficiency and that can reduce the manufacturing loss of the product by early non-destructive detection of any defective filling with the magnetic powder particles.

An inductor component that is one aspect of the present disclosure comprises a base body including a first magnetic layer and a second magnetic layer that are laminated in order along a first direction; and an inductor wire disposed between the first magnetic layer and the second magnetic layer and on a plane that is orthogonal to the first direction. The first magnetic layer includes magnetic powder particles and resin containing the magnetic powder particles. The second magnetic layer includes flat-shaped magnetic powder particles and resin containing the flat-shaped magnetic powder particles. The first magnetic layer is present in a reverse direction to the first direction of the inductor wire, and the second magnetic layer is present in the first direction of the inductor wire and in a direction that is orthogonal to the first direction. When a main surface of the second magnetic layer is viewed from a direction which is orthogonal to the main surface of the second magnetic layer in the first direction, the second magnetic layer includes a dark region corresponding to the inductor wire and a bright region that is a region other than the dark region and whose brightness is higher than that of the dark region.

The dark region present along the inductor wire refers to the state where the dark region extends along the extension direction of the inductor wire and, when the dark region is seen from a direction that intersects the main surface of the second magnetic layer at a right angle, the dark region is adjacent to the inductor wire or the dark region overlaps on at least a portion of the inductor wire.

According to an embodiment, the second magnetic layer includes the magnetic powder particles each having the flattened shape and the diamagnetic field is therefore weakened and high magnetic permeability can therefore be acquired. The inductor wire is disposed between the first magnetic layer and the second magnetic layer, and the second magnetic layer is present in the first direction of the inductor wire and a direction that intersects the first direction at a right angle, and the magnetic powder particles each having the flattened shape can therefore be disposed on the periphery of the inductor wire. The filling rate of the magnetic powder particles each having the flattened shape can thereby be improved and the magnetic permeability on the periphery of the inductor wire can therefore be improved, and the inductance acquisition efficiency can therefore be improved.

When the second magnetic layer is seen from the direction intersecting the main surface of the second magnetic layer at a right angle, the second magnetic layer includes the dark region present along the inductor wire, and a bright region that is a region other than the dark region, and the portion directly on the bright region therefore looks bright and the portion directly on the dark region looks dark on the main surface of the second magnetic layer. It can thereby be recognized that the magnetic powder particles included in the second magnetic layer are in the desired disposition when the second magnetic layer is pressure-bonded to the inductor wire to be manufactured. For example, it can be determined that the long axis of each of the magnetic powder particles included in the bright region is disposed in substantially parallel to the main surface of the second magnetic layer and the long axis of each of the magnetic powder particles included in the dark region is disposed along the direction that substantially intersects the main surface of the second magnetic layer at a right angle. The magnetic powder particles each having the flattened shape have poor fluidity and therefore have a problem in the fillability thereof compared to the magnetic powder particles each having a substantially spherical shape while it can easily be determined whether the magnetic powder particles of the second magnetic layer fill in the desired disposition, by checking the brightness or the darkness of the main surface of the second magnetic layer. Any defective filling with the magnetic powder particles can thereby be detected early in a non-destructive manner and the manufacturing loss of the product can be reduced.

It is preferred in one embodiment of the inductor component that the thickness of the second magnetic layer in the first direction between the main surface of the second magnetic layer and a top face of the inductor wire in the first direction be equal to or smaller than a three-fold amount of the height of the inductor wire in the first direction.

According to the embodiment, the thickness between the main surface of the second magnetic layer and the top face of the inductor wire is equal to or smaller than a three-fold amount of the height of the inductor wire and the dark region and the bright region can therefore be easily recognized.

It is preferred in one embodiment of the inductor component that the base body further include a covering film that covers the main surface of the second magnetic layer, and that the dark region and the bright region be indistinguishable through the covering film.

According to the embodiment, the dark region and the bright region are indistinguishable through the covering film and over-sorting (excessive sorting) can therefore be suppressed at an outer appearance sorting step executed after the manufacture of the inductor component.

It is preferred in one embodiment of the inductor component that the inductor component further comprise an external terminal disposed on the main surface of the second magnetic layer and electrically connected to the inductor wire, that the covering film be disposed in a portion of the main surface of the second magnetic layer to expose the external terminals, and that a main surface of the first magnetic layer in a reverse direction to the first direction become the outermost face of the base body.

According to the embodiment, the manufacturing cost can be reduced by limiting the number of layers that provide the functions, to the minimum.

It is preferred in one embodiment of the inductor component that the first magnetic layer have a flat plate-like shape.

According to the embodiment, the first magnetic layer has a flat plate-like shape and, in the first magnetic layer, the fillability of the magnetic powder particles does not therefore need to be considered in relation to the inductor wire, and the material of the magnetic powder particles can freely be selected. The degree of freedom of selecting the material of the magnetic powder particles is improved.

It is preferred in one embodiment of the inductor component that when the main surface of the first magnetic layer is seen from a direction that is orthogonal to the main surface of the first magnetic layer in the reverse direction to the first direction, the first magnetic layer include a first region corresponding to the inductor wire and a second region that is a region other than the first region and that is indistinguishable in brightness from the first region.

The expression "the first region present along the inductor wire" refers to the state where the first region extends along the extension direction of the inductor wire and, when the first region is seen from the direction intersecting the main surface of the first magnetic layer at a right angle, the first region is adjacent to the inductor wire or the first region overlaps on at least a portion of the inductor wire. The expression "indistinguishable in brightness" means that the difference in the brightness does not need to be zero and some difference is permissible.

According to the embodiment, on the main surface of the first magnetic layer, the portion directly on the first region and the portion directly on the second region look to have equal brightness. The top and the bottom of the inductor component can easily be distinguished from each other from the outer appearance.

It is preferred in one embodiment of the inductor component that the inductor component further comprise cylindrical wires that are each connected to the inductor wire and that each extend in the first direction and penetrate the second magnetic layer.

According to the embodiment, the cylindrical wires can be pulled out each rectilinearly from the inductor wire, and an increase of the DC electric resistance due to excessive routing and reduction of the inductance acquisition efficiency can thereby be suppressed.

It is preferred in one embodiment of the inductor component that at least one of the inductor wire, and the cylindrical wires be in contact with the magnetic powder particles.

According to the embodiment, the inductance acquisition efficiency can be improved by avoiding any unnecessary insulating part. When the plural magnetic powder particles are electrically coupled in the direction intersecting the first direction at a right angle, the spacing between different inductor wires, and the spacing between the turns of the same one inductor wire may each be short-circuited through the magnetic powder particles while the long axis of each of the magnetic powder particles included in the dark region present along the inductor wire is disposed along the direction substantially intersecting the main surface of the second magnetic layer at a aright angle and the short-circuiting is not likely to occur even when at least one of the inductor wire, and the cylindrical wires is in contact with the magnetic powder particles.

It is preferred in one embodiment of the inductor component that the inductor wire include a side face that faces in the direction orthogonal to the first direction, and that the inductor component further comprise a side face insulating part that covers only a portion of the side face.

The meaning of the expression "the side face insulating part covers only a portion of the side face of the inductor wire" includes not only the state where the side face insulating part is in contact with only the portion of the side face of the inductor wire, but also the state where another member is present between the side face insulating part and the portion of the side face of the inductor wire and the side face insulating part covers only the portion of the side face of the inductor wire and the other member as well.

According to the embodiment, the side face insulating part is in contact with only a portion of the side face of the inductor wire and, for example, even in the case where plural magnetic powder particles are electrically coupled in the direction intersecting the first direction at a right angle, the portion of the side face of the inductor wire is not in contact with the magnetic powder particles due to the side face insulating part. The insulation can thereby be secured.

It is preferred in one embodiment of the inductor component that the inductor wire include a bottom face that faces in the reverse direction to the first direction, and that the inductor component further comprise a bottom face insulating part in contact with the bottom face.

According to the embodiment, the bottom face of the inductor wire is not in contact with the magnetic powder particles of the first magnetic layer due to the bottom face insulating part. The insulation can thereby be improved.

It is preferred in one embodiment of the inductor component that the height of the side face insulating part in the first direction is equal to or smaller than a half of the height of the inductor wire in the first direction.

The "height" refers to the value measured in a cross-section that intersects the direction in which the inductor wire extends, at a right angle.

According to the embodiment, the volume of the magnetic layer is increased, and the inductance acquisition efficiency is further improved concurrently securing the insulation, by reducing the height of the side face insulating part.

It is preferred in one embodiment of the inductor component that the inductor wire include a top face that faces in the first direction, that the inductor component further comprise a circumferential face insulating part in contact with the side face and the top face, that the composition of the circumferential face insulating part differ from the composition of the side face insulating part and the composition of the bottom face insulating part, and that the thickness of the side face insulating part be larger than the thickness of the circumferential face insulating part.

The thickness refers to the maximal value that is measured in a cross-section that intersects the direction in which the inductor wire extends, at a right angle.

According to the embodiment, the insulation can further be improved.

It is preferred in one embodiment of the inductor component that the inductor wire include a side face that faces in a direction orthogonal to the first direction, and that in a cross-section in the direction orthogonal to an extending direction of the inductor wire, the second magnetic layer include a side face nearby region that is present between the side face of the inductor wire and a position distant from the side face by a predetermined distance in a direction orthogonal to the first direction, and the angle formed by a long axis of each of the flat-shaped magnetic powder particles included in the side face nearby region with respect to the side face be equal to or smaller than 45°.

The side face nearby region is the region that is surrounded by the side face, the position distant from the side face by a predetermined distance, an extended face including the top face, and an extended face including the bottom face. The distance from the side face of the inductor wire is the distance from an end on the side of the bottom face of the side face of the inductor wire. The predetermined distance is one third of the width in the direction intersecting the first direction of the inductor wire at a right angle.

The long axis of each of the magnetic powder particles is the straight line that passes through the longest portion of the magnetic powder particle in the above cross-section. The angle formed by the long axis of each of the magnetic powder particles relative to the side face is derived by acquiring an SEM image in a cross-section that intersects the extension direction of the inductor wire, at a right angle, to binarize the SEM image in white for the magnetic powder particles and black for the resin and by measuring the angle formed by an intersection of the long axis of the magnetic powder particle and the side face of the inductor wire with each other.

According to the embodiment, the angle formed by the long axis of the magnetic powder particle relative to the side face is equal to or smaller than 45° and, in the side face nearby region, the long axis of the magnetic powder particle is therefore disposed in substantially parallel to the side face of the inductor wire. The magnetic powder particles and the resin are therefore alternately disposed along the direction intersecting the first direction at a right angle, in the side face nearby region, and the insulation can be secured concurrently maintaining the inductance acquisition efficiency.

It is preferred in one embodiment of the inductor component that the inductor wire include a side face that faces in the direction orthogonal to the first direction, and that in a cross-section in the direction orthogonal to an extending direction of the inductor wire, the angle that is formed at a point by the long axis of each of the flat-shaped magnetic powder particles included in the second magnetic layer with respect to the side face become larger as the point becomes more distant in the direction orthogonal to the first direction from the side face of the inductor wire.

The expression "the angle that is formed at a point by the long axis of the magnetic powder particle relative to the side face is increased" refers to variation of the angle from 0° to 90°.

According to the embodiment, in the nearby region of the side face of the inductor wire, the long axis of the magnetic powder particle is disposed in substantially parallel to the side face and the magnetic powder particles and the resin are therefore alternately disposed along the direction intersecting the first direction at a right angle, and the insulation can be secured concurrently maintaining the inductance acquisition efficiency.

It is preferred in one embodiment of the inductor component that the first magnetic layer include the flat shaped magnetic powder particles, that the inductor wire include a bottom face that faces in the reverse direction to the first direction, and that in the cross-section in the direction orthogonal to an extending direction of the inductor wire, an angle formed by a long axis of each of the flat shaped magnetic powder particles included in the first magnetic layer with respect to the bottom face be equal to or smaller than 45°.

According to the embodiment, the angle formed by the long axis of the magnetic powder particle relative to the bottom face is equal to or smaller than 45° and the long axis of the magnetic powder particle is therefore disposed in substantially parallel to the bottom face of the inductor wire. The magnetic powder particles are therefore arranged in parallel to the magnetic flux and high relative magnetic permeability can be acquired.

It is preferred in one embodiment of the inductor component that in a cross-section that is at a center in an extending direction of the inductor wire and in the direction orthogonal to the extending direction of the inductor wire, denoting a maximum Ferret length of the magnetic powder particles as "LF" and denoting a thickness intersecting the maximum Ferret length of the magnetic powder particles at a right angle as "TF", LF/TF be $LF/TF \geq 10$ and D90 of the maximum Ferret length be equal to or smaller than 100 μm.

D90 of the maximum Ferret length is acquired by acquiring about three SEM images each depicting a region of 200 μm×200 μm in the above cross-section and calculating D90 thereof.

According to the embodiment, LF/TF is $LF/TF \geq 10$ and the oblateness of each of the magnetic powder particles can therefore be increased and higher relative magnetic permeability can thereby be acquired.

D90 of the maximum Ferret length is equal to or smaller than 100 μm and the insulation can therefore be secured. For example, in the case where the maximum Ferret length is excessively large, the spacing between different inductor wires and the spacing between turns of the same one inductor wire are each highly likely to be short-circuited through the magnetic powder particles.

It is preferred in one embodiment of the inductor component that in each of the first magnetic layer and the second magnetic layer, the void rate be equal to or higher than 1 vol % and equal to or lower than 10 vol % (i.e., from 1 vol % to 10 vol %).

According to the above embodiment, the void rate is equal to or higher than 1 vol %, and stresses from a residual stress and an external stress can therefore be alleviated by the voids. The void rate is equal to or lower than 10 vol %, and reduction of the inductance and reduction of the strength of the base body can therefore be suppressed.

It is preferred in one embodiment of the inductor component that plural inductor wires be disposed along the first direction, and that the dark region be a region corresponding to the inductor wire positioned on the outermost side in the first direction.

According to the embodiment, the influence on the mounting area can be reduced by laminating the inductor wires on each other. When the laminated inductor wires are connected in series, the inductance can be enhanced.

It is preferred that one embodiment of a manufacturing method of an inductor component comprise the steps of forming an inductor wire on a main surface of a base substrate; pressure-bonding a magnetic sheet that includes flat shaped magnetic powder particles and resin including the magnetic powder particles from above of a main surface of the base substrate toward the inductor wire to cover a top face and a side face of the inductor wire with the magnetic sheet; and looking at the magnetic sheet from above of the magnetic sheet to check whether the side face of the inductor wire is filled with the magnetic powder particles by distinguishing brightness and darkness from each other.

According to the embodiment, it can easily be determined whether the side face of the inductor wire is filled with the magnetic powder particles, by looking at the magnetic sheet from above of the magnetic sheet to check the brightness or the darkness, and any defective filling with the magnetic powder particles can thereby be detected early in a non-destructive manner and at the manufacturing stage of the inductor component, and the manufacturing loss of the product can be reduced.

According to the inductor component and the manufacturing method thereof that are an aspect of the present disclosure, the inductance acquisition efficiency can be improved and the manufacturing loss of the product can be reduced by early non-destructive detection of any defective filling with the magnetic powder particles.

DETAILED DESCRIPTION

An inductor component and a manufacturing method thereof that are one aspect of the present disclosure will be described below in detail with reference to depicted embodiments. The drawings partially include schematic ones and may not reflect the actual dimensions and actual proportions.

First Embodiment

Configuration

Figure 1:
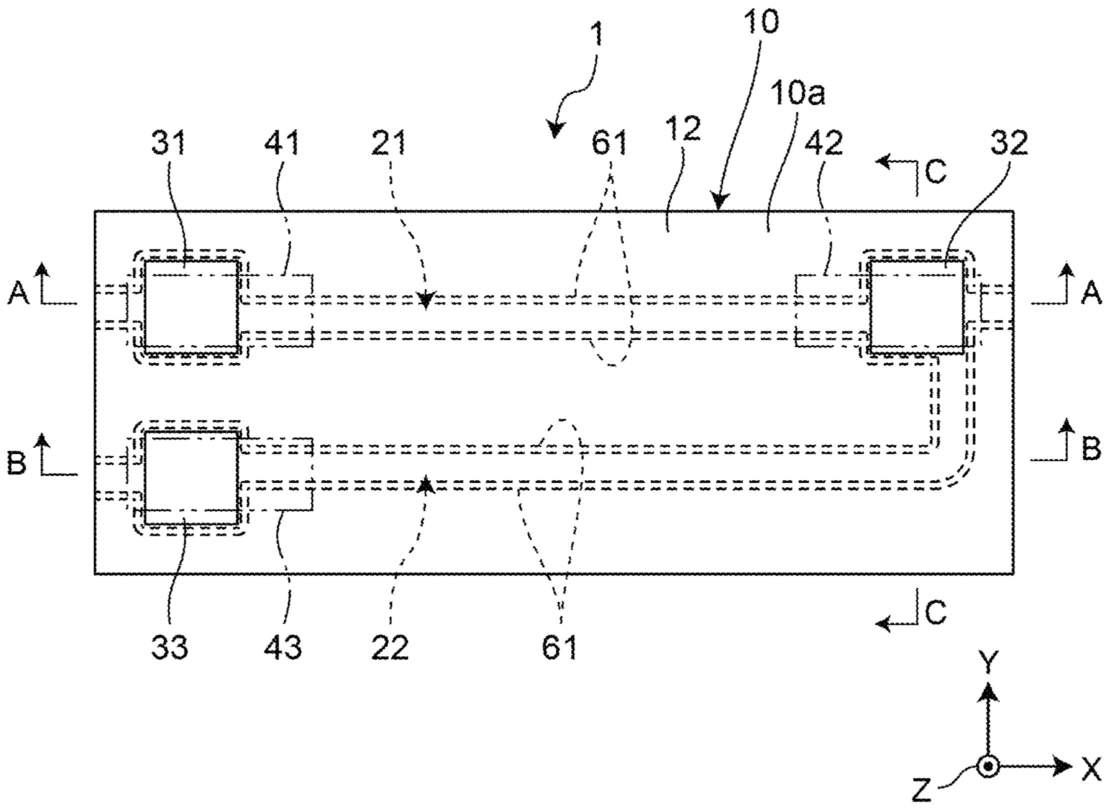
FIG. 1 is a plan view depicting a first embodiment of an inductor component.
Figure 2A:
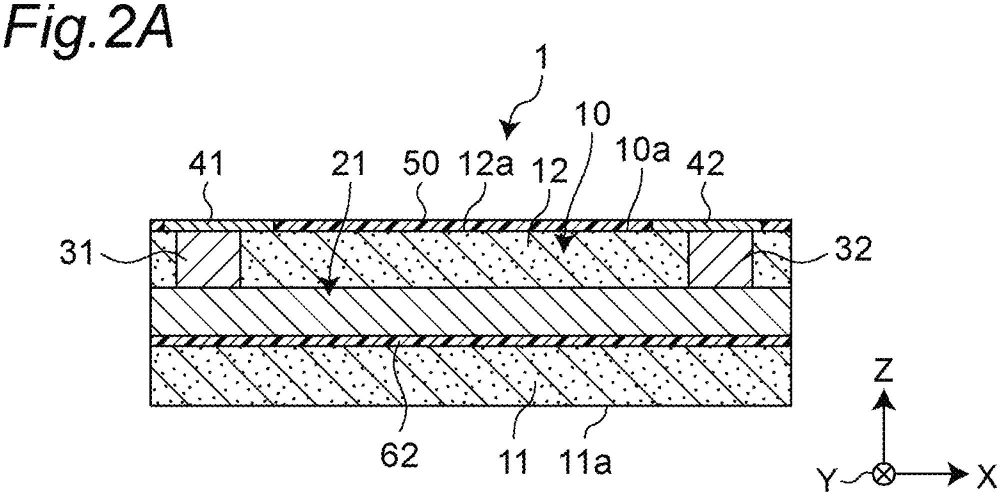
FIG. 2A is a cross-sectional view taken along A-A in FIG. 1.
Figure 2B:
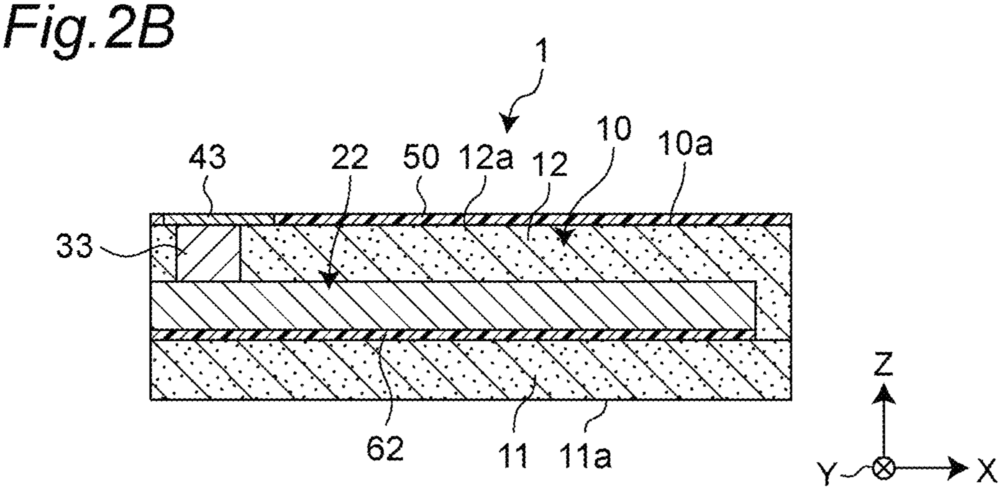
FIG. 2B is a cross-sectional view taken along B-B in FIG. 1.
Figure 2C:
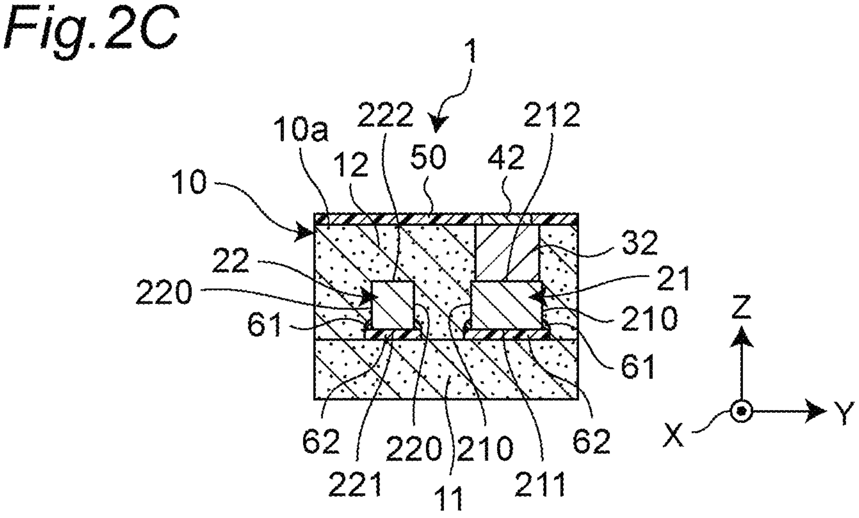
FIG. 2C is a cross-sectional view taken along C-C in FIG. 1.

FIG. 1 is a plan view depicting a first embodiment of an inductor component. FIG. 2A is a cross-sectional view taken along A-A in FIG. 1. FIG. 2B is a cross-sectional view taken along B-B in FIG. 1. FIG. 2C is a cross-sectional view taken along C-C in FIG. 1.

An inductor component 1 is mounted on an electronic device such as a personal computer, a DVD player, a digital camera, a TV, a mobile phone, or car electronics, and is a part having an overall shape of, for example, a cuboid shape. The shape of the inductor component 1 is however not especially limited and may be a cylindrical shape, a polygonal cylindrical shape, a conical trapezoidal shape, or a polygonal pyramid trapezoidal shape.

As depicted in FIG. 1, FIG. 2A, FIG. 2B, and FIG. 2C, the inductor component 1 includes a base body 10, a first inductor wire 21 and a second inductor wire 22 that are disposed in the base body 10, a side face insulating part 61 and a bottom face insulating part 62 that cover a portion of each of the first inductor wire 21 and the second inductor wire 22, a first cylindrical wire 31, a second cylindrical wire 32, and a third cylindrical wire 33 that are embedded in the base body 10 for end faces thereof to be exposed from a first main surface 10*a* of the base body 10, a first external terminal 41, a second external terminal 42, and a third external terminal 43 that are disposed on the first main surface 10*a* of the base body 10, and a covering film 50 that is disposed on the first main surface 10*a* of the base body 10.

In the drawings, the thickness direction of the inductor component 1 is referred to as "Z-direction", a forward Z-direction is referred to as "upper side" and a reverse Z-direction is referred to as "lower side". In a plane intersecting the Z-direction of the inductor component 1 at a right angle, the length direction of the inductor component 1 is referred to as "X-direction" and the width direction of the inductor component 1 is referred to as "Y-direction". FIG. 1 does not depict the covering film 50.

The base body 10 includes a first magnetic layer 11 and a second magnetic layer 12 that are laminated in order along the forward Z-direction (that corresponds to a "first direction" described in the claims). The first magnetic layer 11 and the second magnetic layer 12 each include a magnetic powder particles each having a flattened shape and resin that includes the magnetic powder particles. The resin is an organic insulating material that includes, for example, an epoxy-based resin, bismaleimide, a liquid crystal polymer, or polyimide. The magnetic powder particles are, for example, an FeSi-based alloy such as FeSiCr, an FeCo-based alloy, an Fe-based alloy such as NiFe, or an amorphous alloy of any of these.

It is preferred that the magnetic powder particles each include Fe at 80 wt % or higher and each include Si and Al at 2 wt % or higher. A composition of the magnetic powder particles is calculated from EDX. For example, the magnifying power is 5,000 times and the average value from values at five points is acquired. According to the above configuration, magnetic striction can be reduced and the relative magnetic permeability can be enhanced by adding Si and Al.

It is preferred that, in each of the first magnetic layer 11 and the second magnetic layer 12, the filling rate of the magnetic powder particles be equal to or higher than 50 vol % and equal to or lower than 75 vol % (i.e., from 50 vol % to 75 vol %). According to the above configuration, the filling rate of the magnetic powder particles is equal to or higher than 50 vol % and the relative magnetic permeability can therefore be enhanced by increasing the amount of the magnetic powder particles. The filling rate of the magnetic powder particles is 75 vol % or lower and the insulation can be secured by reducing the electric connection among plural magnetic powder particles.

It is preferred that, in each of the first magnetic layer 11 and the second magnetic layer 12, the void rate be equal to or higher than 1 vol % and equal to or lower than 10 vol % (i.e., from 1 vol % to 10 vol %). According to the above configuration, the void rate is equal to or higher than 1 vol % and stresses from a residual stress and an external stress can therefore be alleviated by the voids. The void rate is equal to or lower than 10 vol % and reduction of the inductance and reduction of the strength of the base body can therefore be suppressed.

The first inductor wire 21 and the second inductor wire 22 are disposed on a plane that is present between the first magnetic layer 11 and the second magnetic layer 12 and that intersects the Z-direction at a right angle. The first inductor wire 21 and the second inductor wire 22 are disposed on the same one plane. According to this, height reduction of the inductor component 1 can be realized. An inductor array can be configured by the first inductor wire 21 and the second inductor wire 22 that are disposed on the same one plane.

For example, the first magnetic layer 11 is present in the reverse Z-direction of the first inductor wire 21 and the second inductor wire 22. The second magnetic layer 12 is present in the forward Z-direction and in a direction that intersects the forward Z-direction at a right angle of the first inductor wire 21 and the second inductor wire 22.

When the first inductor wire 21 is seen from the Z-direction, the first inductor wire 21 extends in a straight line along the X-direction. When the second inductor wire 22 is seen from the Z-direction, a portion thereof extends in a straight line along the X-direction and the other portion extends in a straight line along the Y-direction, that is, the second inductor wire 22 extends in an L-shape.

It is preferred that the thickness of each of the first and the second inductor wires 21 and 22 be, for example, equal to or larger than 40 μm and equal to or smaller than 120 μm (i.e., from 40 μm to 120 μm). In Example of the first and the second inductor wires 21 and 22, the thickness is 35 μm, the wire width is 50 μm, and the largest space between the wires is 200 μm.

The first inductor wire 21 and the second inductor wire 22 each include a conducting material and each include, for example, a metal material having low electric resistance such as Cu, Ag, Au, or Al. In this embodiment, the inductor component 1 includes only one layer of each of the first and the second inductor wires 21 and 22, and height reduction of the inductor component 1 can therefore be realized.

A first end of the first inductor wire 21 is electrically connected to the first cylindrical wire 31 and a second end of the first inductor wire 21 is electrically connected to the second cylindrical wire 32. The first inductor wire 21 includes a pad part having a large line width, at each of both ends thereof and, in the pad parts, is directly connected to the first and the second cylindrical wires 31 and 32.

A first end of the second inductor wire 22 is electrically connected to the third cylindrical wire 33. The second inductor wire 22 includes a pad part at the first end thereof and, in the pad part, is directly connected to the third cylindrical wire 33. A second end of the second inductor wire 22 is connected to the pad part of the second end of the first inductor wire 21 and is electrically connected to the second cylindrical wire 32. The first end of the first inductor wire 21 and the first end of the second inductor wire 22 are positioned on the side of the same one side of the base body 10 when the first ends are seen from the Z-direction.

The first inductor wire 21 is formed in a square shape in a cross-section intersecting the extension direction thereof at a right angle. The first inductor wire 21 includes a first side face 210 facing in the forward Y-direction, a second side face 210 facing in the reverse Y-direction, a bottom face 211 facing in the reverse Z-direction, and a top face 212 facing in the forward Z-direction. The first side face 210 does not need to completely face in the forward Y-direction and may face in the forward Y-direction being slightly inclined to the forward Y-direction, that is, the first side face 210 substantially face in the forward Y-direction. Similarly, the second side face 210 substantially face in the reverse Y-direction, the bottom face 211 substantially face in the reverse Z-direction, and the top face 212 substantially face in the forward Z-direction.

Similarly, the second inductor wire 22 is formed in a square shape in a cross-section intersecting the extension direction thereof at a right angle. The second inductor wire 22 includes a first side face 220 facing in the forward Y-direction, a second side face 220 facing in the reverse Y-direction, a bottom face 221 facing in the reverse Z-direction, and a top face 222 facing in the forward Z-direction.

Wires further extend, from the connection positions of the first and the second inductor wires 21 and 22 to the first to the third cylindrical wires 31 to 33, toward the outer side of a chip and the wires are exposed on the outer side of the chip. The first and the second inductor wires 21 and 22 each include an exposed part that is exposed from the side face that is parallel to the lamination direction of the inductor component 1, to the exterior. In the manufacture process of the inductor component 1, the wires are the wires to be connected to power feeding wires for the time when electrolytic plating is additionally executed after forming the shapes of the first and the second inductor wires 21 and 22. In the state of an inductor substrate acquired before the inductor component 1 is individuated, the electrolytic plating can easily be additionally executed using the power feeding wires, and the wire spacing can be narrowed. The magnetic coupling between the first and the second inductor wires 21 and 22 can be enhanced by narrowing the wire spacing between the first and the second inductor wires 21 and 22 by additionally executing the electrolytic plating.

The first to the third cylindrical wires 31 to 33 extend from the inductor wires 21 and 22 in the Z-direction and penetrate the inside of the second magnetic layer 12. The first cylindrical wire 31 extends from an upper face of one end of the first inductor wire 21 to the upper side, and an end face of the first cylindrical wire 31 is exposed from the first main surface 10*a* of the base body 10 (that is also the main surface of the second magnetic layer 12). The second cylindrical wire 32 extends from an upper face of the other end of the first inductor wire 21 to the upper side, and an end face of the second cylindrical wire 32 is exposed from the first main surface 10*a* of the base body 10. The third cylindrical wire 33 extends from an upper face of one end of the second inductor wire 22 to the upper side, and an end face of the third cylindrical wire 33 is exposed from the first main surface 10*a* of the base body 10.

The first cylindrical wire 31, the second cylindrical wire 32, and the third cylindrical wire 33 therefore extend each in a straight line in the direction intersecting the first main surface 10*a* at a right angle, from the first inductor wire 21 and the second inductor wire 22 to the end faces exposed from the first main surface 10*a*. The first external terminal 41, the second external terminal 42, and the third external terminal 43, and the first inductor wire 21 and the second inductor wire 22 can thereby be connected to each other over a shorter distance, and reduction of the resistance and enhancement of the inductance of the inductor component 1 can be realized. The first to the third cylindrical wires 31 to 33 can be pulled out each in a straight line from the first and the second inductor wires 21 and 22, and an increase of the DC electric resistance due to excessive routing and reduction of the inductance acquisition efficiency can thereby be suppressed. The first to the third cylindrical wires 31 to 33 each include a conducting material and each include, for example, the same material as that of the inductor wires 21 and 22. The first to the third cylindrical wires 31 to 33 may be electrically connected to the first and the second inductor wires 21 and 22 through via conductors not depicted.

The first to the third external terminals 41 to 43 are disposed on the first main surface 10*a* of the base body 10. The first to the third external terminals 41 to 43 each include a conducting material and each have a three-layer configuration, for example, for Cu having low electric resistance and an excellent anti-stress property, Ni excellent in the anti-corrosion property, and Au excellent in the solder wettability and the reliability to be arranged in this order from the inner side to the outer side.

The first external terminal 41 is in contact with the end face that is exposed from the first main surface 10*a* of the base body 10, of the first cylindrical wire 31, and is electrically connected to the first cylindrical wire 31. The first external terminal 41 is thereby electrically connected to the one end of the first inductor wire 21. The second external terminal 42 is in contact with the end face that is exposed from the first main surface 10*a* of the base body 10, of the second cylindrical wire 32, and is electrically connected to the second cylindrical wire 32. The second external terminal 42 is thereby electrically connected to the other end of the first inductor wire 21 and the other end of the second inductor wire 22. The third external terminal 43 is in contact with the end face of the third cylindrical wire 33, is electrically connected to the third cylindrical wire 33, and is electrically connected to the one end of the second inductor wire 22.

The covering film 50 is disposed in a portion in which the first to the third external terminals 41 to 43 are not disposed, of the first main surface 10*a* of the base body 10. The covering film 50 may be overlapped by the first to the third external terminals 41 to 43 by extending of the end portions of the first to the third external terminals 41 to 43 onto the covering film 50. The covering film 50 includes resin material having high electric insulation, such as, for example, an acrylic resin, an epoxy-based resin, or polyimide. The insulation can thereby be improved among the first to the third external terminals 41 to 43. The covering film 50 also acts as a mask for forming the patterns of the first to the third external terminals 41 to 43 and the manufacture efficiency is therefore improved. In the case where the magnetic powder particles are exposed from the resin, the covering film 50 covers the exposed magnetic powder particles and the exposure of the magnetic powder particles to the exterior can thereby be prevented. The covering film 50 may include a filler that includes an insulating material.

The side face insulating part 61 covers only a portion of each of the two side faces 210 of the first inductor wire 21. The side face insulating part 61 overs only a portion of each of the two side faces 220 of the second inductor wire 22. The bottom face insulating part 62 covers the bottom face 211 of the first inductor wire 21. The bottom face insulating part 62 covers the bottom face 211 of the second inductor wire 22.

Figure 3:
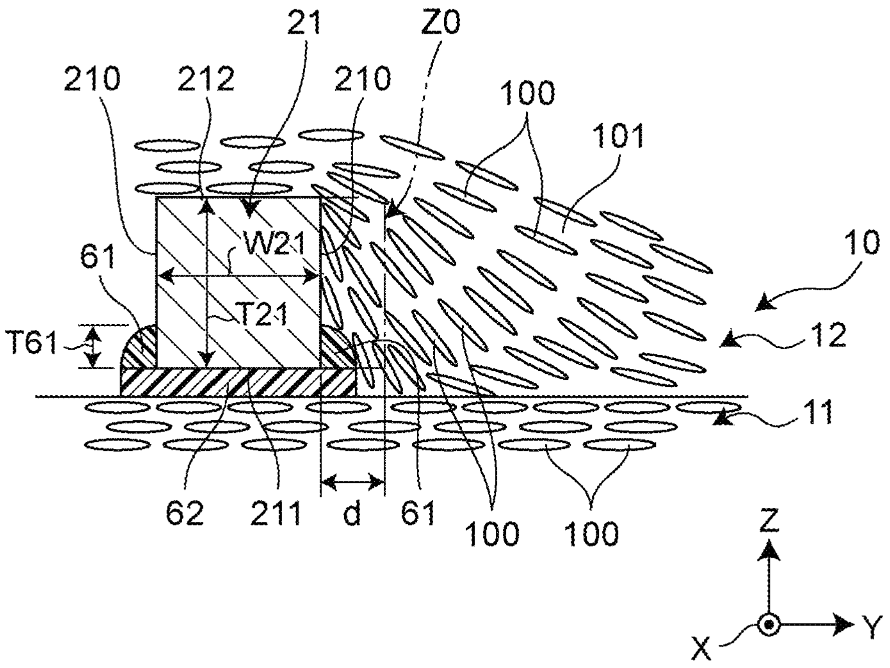
FIG. 3 is a simplified view of a cross-section that intersects the direction in which a first inductor wire extends, at a right angle.
Figure 4:
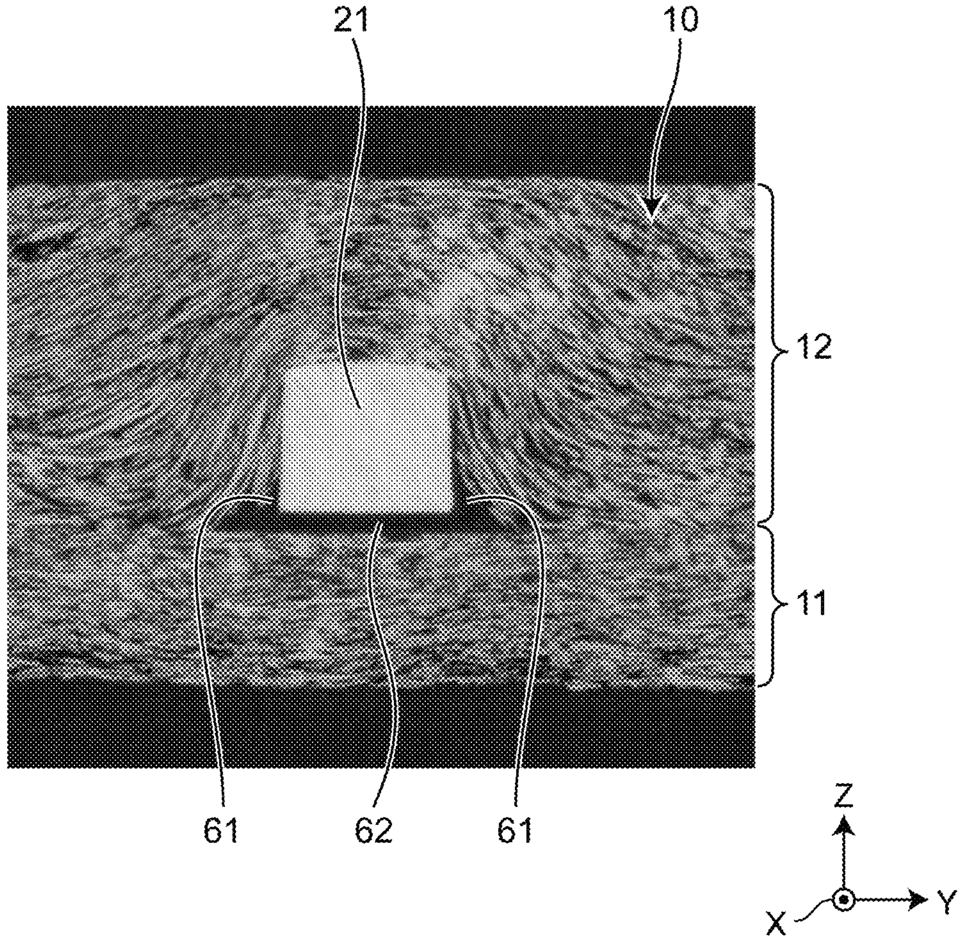
FIG. 4 is an image view corresponding to FIG. 3.

FIG. 3 is a simplified view of a cross-section that is at the center in the direction in which the first inductor wire 21 extends and that intersects the direction in which the first inductor wire 21 extends, at a right angle. FIG. 4 is an image view corresponding to FIG. 3. FIG. 3 does not depict the magnetic powder particles 100 on the left side of the first inductor wire 21 while the left side of the first inductor wire 21 is same as the right side thereof. The same is applied to the cross-sectional view of the periphery of the second inductor wire 22 and the cross-sectional view will not be described.

As depicted in FIG. 3 and FIG. 4, the first magnetic layer 11 and the second magnetic layer 12 each include the magnetic powder particles 100 each having a flattened shape and resin 101 that includes the magnetic powder particles 100. In FIG. 3, no hatching for the magnetic powder particles 100 and the resin 101 is depicted. In FIG. 4, the magnetic powder particles 100 are depicted as white lines. The magnetic powder particles 100 each having the flattened shape each include at least one short axis. The dimension in at least one direction only has to be smaller than the dimensions in other directions and, for example, in the three dimensions, the magnetic powder particle 100 may be a flattened particle such as a disk or may be a flattened particle such as a needle. The outer face of the magnetic powder particle 100 may be smooth or may include recesses and protrusions.

According to the above configuration, the first magnetic layer 11 and the second magnetic layer 12 each include the magnetic powder particles 100 each having the flattened shape and the diamagnetic field is therefore weakened and high relative magnetic permeability can be acquired. The first inductor wire 21 is disposed between the first magnetic layer 11 and the second magnetic layer 12, and the magnetic powder particles 100 each having the flattened shape can therefore be disposed on the periphery of the first inductor wire 21. The filing rate of the magnetic powder particles 100 each having the flattened shape can thereby be improved, the magnetic permeability on the periphery of the first inductor wire 21 can be improved, and the inductance acquisition efficiency can be improved.

The side face insulating part 61 is in contact with only a portion of the side face 210 of the first inductor wire 21. According to this, for example, even in the case where the plural magnetic powder particles 100 are electrically coupled in the Y-direction, the portion of the side face 210 of the first inductor wire 21 is not in contact with the magnetic powder particles 100 due to the side face insulating part 61. The insulation can thereby be secured.

The side face insulating part 61 includes the same material as that of the resin 101 of the second magnetic layer 12. According to this, the residual stress in the base body 10 can be reduced. The side face insulating part 61 has a border with the resin 101 while the side face insulating part 61 may have no border with the second magnetic layer 12. The side face insulating part 61 may be continuously integrated with the resin 101 of the second magnetic layer 12.

The bottom face insulating part 62 is in contact with the bottom face 211 of the first inductor wire 21. According to this, the bottom face 211 of the first inductor wire 21 is not in contact with the magnetic powder particles 100 of the first magnetic layer 11 due to the bottom face insulating part 62. The insulation can therefore be secured.

The side face insulating part 61 is in contact with the bottom face insulating part 62. The side face insulating part 61 is in contact with a portion that is close to the bottom face 211, of the side face 210. According to this, a corner portion between the side face 210 and the bottom face 211 of the first inductor wire 21 can be covered by the side face insulating part 61 and the bottom face insulating part 62, and the insulation can therefore be further improved. In the first magnetic layer 11, a long axis (that is a long axis L depicted in FIG. 5) of the magnetic powder particle 100 is disposed in substantially parallel to the bottom face 211 of the first inductor wire 21, and the corner portion of the first inductor wire 21 is not thereby in contact with the magnetic powder particles 100 due to the side face insulating part 61 and the bottom face insulating part 62 even in the case where the plural magnetic powder particles 100 are electrically coupled in the Y-direction.

The composition of the side face insulating part 61 and the composition of the bottom face insulating part 62 differ from each other. For example, the resin of the side face insulating part 61 and the resin of the bottom face insulating part 62 differ from each other. According to this, the design scope of each of the side face insulating part 61 and the bottom face insulating part 62 is expanded. The reliability of the inductor component 1 can be improved by, for example, selecting resin having high adhesiveness with the first inductor wire 21, as the bottom face insulating part 62. The residual stress of the overall inductor component 1 can be alleviated by selecting resin having a property of alleviating a stress (such as, for example, the thermal expansion rate or the Young's modulus), as the side face insulating part 61.

A height T61 in the Z-direction of the side face insulating part 61 is equal to or smaller than a half of a height T21 in the Z-direction of the first inductor wire 21. It is preferred that the height T61 be equal to or smaller than one third of the height T21. The heights T61 and T21 are the values measured in a cross-section that intersects the direction in which the first inductor wire 21 extends, at a right angle. According to this, the volume of the second magnetic layer 12 is increased by reducing the height of the side face insulating part 61, and the inductance acquisition efficiency is further improved concurrently securing the insulation.

Figure 5:
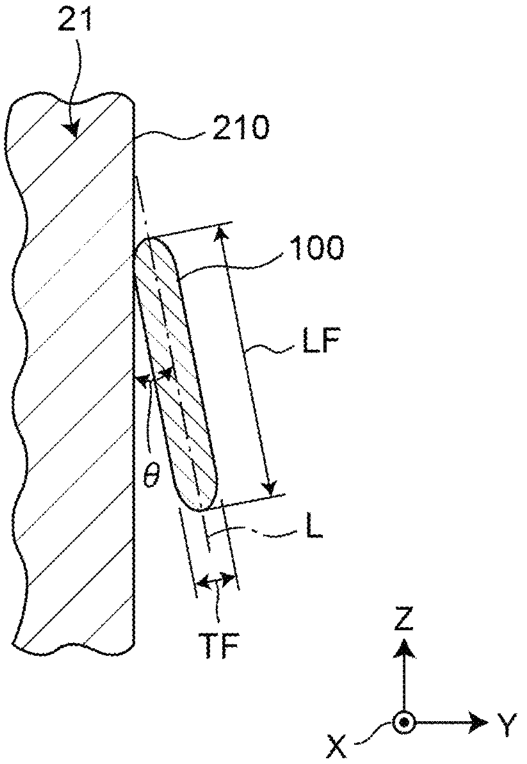
FIG. 5 is an enlarged view of a portion of FIG. 3.

FIG. 5 is an enlarged view of a portion of FIG. 3. As depicted in FIG. 3 and FIG. 5, in a cross-section intersecting the direction in which the first inductor wire 21 extends, at a right angle (that is a YZ-cross-section in this embodiment), the second magnetic layer 12 includes a side face nearby region Z0 present between the side face 210 of the first inductor wire 21 and a position distant from the side face 210 by a predetermined distance d in the Y-direction.

For example, in the above YZ-cross-section, the side face nearby region Z0 is the region that is surrounded by the side face 210, the position distant from the side face 210 by the predetermined distance d, an extended face including the top face 212, and an extended face including the bottom face 211. The distance from the side face 210 of the first inductor wire 21 is the distance from an end on the side of the bottom face 211 of the side face 210 of the first inductor wire 21. The predetermined distance d is one third of a width W21 in the Y-direction of the first inductor wire 21.

An angle θ formed by the long axis L of each of the magnetic powder particles 100 each having a flattened shape that are included in the side face nearby region Z0 relative to the side face 210 is equal to or smaller than 45°. The long axis L of each of the magnetic powder particles 100 is a straight line that passes through the longest portion of the magnetic powder particle 100 in the above YZ-plane. The angle θ refers to the angle present not on the side of the top face 212 but on the side of the bottom face 211, of the angles formed by the long axis L and the side face 210.

Figure 6:
FIG. 6 is an enlarged image view in a cross-section that intersects the extension direction of the first inductor wire at a right angle.

As the deriving method for the above angle θ, as depicted in FIG. 6, an SEM image in a cross-section that intersects the extension direction of the first inductor wire 21 at a right angle, is acquired to binarize the SEM image in white for the magnetic powder particles and in black for the resin, and the angle θ is derived by measuring the angle formed by an intersection of the long axis L of the magnetic powder particle and the side face 210 of the first inductor wire 21 with each other. The angle θ of each of the magnetic powder particles 100 isolated from the side face 210 is acquired from the angle formed by an intersection of an extended line of the long axis L of the magnetic powder particle 100 and the side face 210 with each other.

According to the above configuration, the angle θ is equal to or smaller than 45° and the long axis L of each of the magnetic powder particles 100 is therefore disposed in substantially parallel to the side face 210 of the first inductor wire 21 in the side face nearby region Z0. The magnetic powder particle 100 and the resin 101 are therefore alternately disposed along the Y-direction in the side face nearby region Z0, and the insulation can be secured concurrently maintaining the inductance acquisition efficiency.

In the above YZ-cross-section, the angle θ at a point becomes larger as the point becomes more distant in the Y-direction from the side face 210 of the first inductor wire 21. The expression "the angle θ become larger" refers to variation of the angle from 0° to 90°.

According to the above configuration, in the nearby region of the side face 210 of the first inductor wire 21, the long axis L of each of the magnetic powder particles 100 is disposed in substantially parallel to the side face 210 and the magnetic powder particles 100 and the resin 101 are therefore alternately disposed along the Y-direction, and the insulation is can therefore be secured concurrently maintaining the inductance acquisition efficiency.

An angle formed by the long axis L of each of the magnetic powder particles 100 included in the first magnetic layer 11 relative to the bottom face 211 in the above YZ-cross-section is equal to or smaller than 45°.

According to the above configuration, the angle formed by the long axis L of each of the magnetic powder particles 100 relative to the bottom face 211 is equal to or smaller than 45° and the long axis L of each of the magnetic powder particles 100 is therefore disposed in substantially parallel to the bottom face 211 of the first inductor wire 21. The magnetic powder particles 100 are arranged in parallel to the magnetic flux and high relative magnetic permeability can be acquired.

In a cross-section that is at the center in the direction in which the first inductor wire 21 extends and that intersects the direction in which the first inductor wire 21 extends, at a right angle (that is the YZ-cross-section in this embodiment), denoting the maximum Ferret length of the magnetic powder particles 100 as "LF" and denoting the thickness intersecting the maximum Ferret length of the magnetic powder particles 100 at a right angle as "TF", LF/TF is LF/TF≥10 and D90 of the maximum Ferret length is equal to or smaller than 100 μm. D90 of the maximum Ferret length is acquired by acquiring about three SEM images each depicting a region of 200 μm×200 μm in the above cross-section and calculating D90 of each thereof.

According to the above configuration, LF/TF is LF/TF≥10 and the oblateness of each of the magnetic powder particles 100 can therefore be increased and higher relative magnetic permeability can thereby be acquired. D90 of the maximum Ferret length is equal to or smaller than 100 μm and the insulation can therefore be secured. For example, in the case where the maximum Ferret length is excessively large, the spacing between different inductor wires and the spacing between turns of the same one inductor wire are each highly likely to be short-circuited through the magnetic powder particles 100.

Figure 7A:
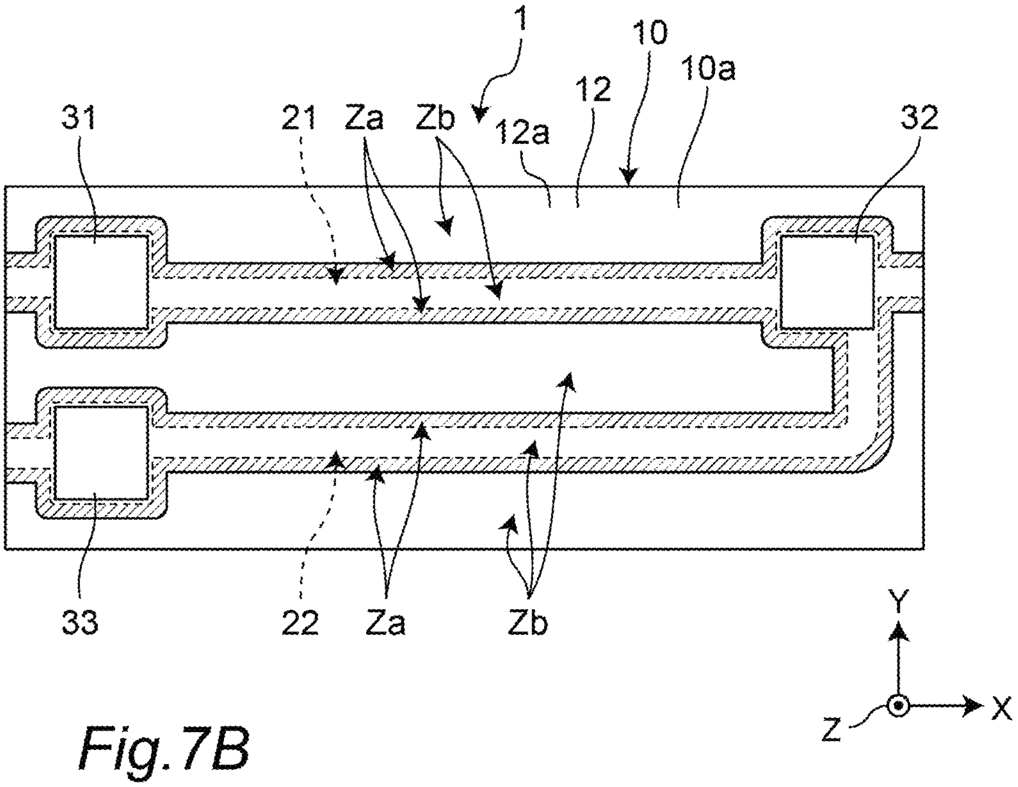
FIG. 7A is a plan view of the inductor component.

FIG. 7A is a plan view of the inductor component 1. FIG. 7A does not depict the external terminals 41 to 43 and the covering film 50.

As depicted in FIG. 7A, when a main surface 12*a* of the second magnetic layer 12 (that also is the main surface 10*a* of the base body 10) is seen from a direction that intersects the main surface 12*a* of the second magnetic layer 12 at a right angle, the second magnetic layer 12 includes a dark region Za present along the first and the second inductor wires 21 and 22, and a bright region Zb that is a region other than the dark region Za and whose brightness is higher than that of the dark region Za. FIG. 7A depicts the dark region Za by hatching. For example, the dark region Za extends along the extension direction of the first and the second inductor wires 21 and 22 and, when the dark region Za is seen from the direction intersecting the main surface 12*a* of the second magnetic layer 12 at a right angle, the dark region Za is adjacent to the first and the second inductor wires 21 and 22.

According to the above configuration, when the second magnetic layer 12 is seen from the direction intersecting the main surface 12*a* of the second magnetic layer 12 at a right angle, the second magnetic layer 12 includes the dark region Za present along the first and the second inductor wires 21 and 22, and the bright region Zb that is a region other than the dark region Za, and the portion directly on the bright region Zb looks bright and the portion directly on the dark region Za looks dark. It can thereby be recognized that the magnetic powder particles 100 included in the second magnetic layer 12 are in the desired disposition when the second magnetic layer 12 is pressure-bonded to the first and the second inductor wires 21 and 22 to be manufactured.

For example, it can be determined that the long axis of each of the magnetic powder particles 100 included in the bright region Zb is disposed in substantially parallel to the main surface 12*a* of the second magnetic layer 12 and the long axis of each of the magnetic powder particles 100 included in the dark region Za is disposed along the direction that substantially intersects the main surface 12*a* of the second magnetic layer 12 at a right angle. The magnetic powder particles 100 included in the bright region Zb reflect light and the portion directly on the bright region Zb therefore looks bright, and the magnetic powder particles 100 included in the dark region Za tend to avoid reflecting light and the portion directly on the dark region Za therefore looks dark.

The magnetic powder particles 100 each having a flattened shape have poor fluidity and have a problem in the filling rate thereof compared to the magnetic powder particles 100 each having a substantially spherical shape while it can easily be determined whether the magnetic powder particles 100 of the second magnetic layer 12 fill in the desired disposition, by checking the brightness or the darkness of the main surface 12*a* of the second magnetic layer 12. Any defective filling with the magnetic powder particles 100 can thereby be detected early in a non-destructive manner and the manufacturing loss of the product can be reduced. It is preferred that the brightness or the darkness of the main surface 12*a* of the second magnetic layer 12 be checked before disposing the external terminals 41 to 43 and the covering film 50.

Figure 8:
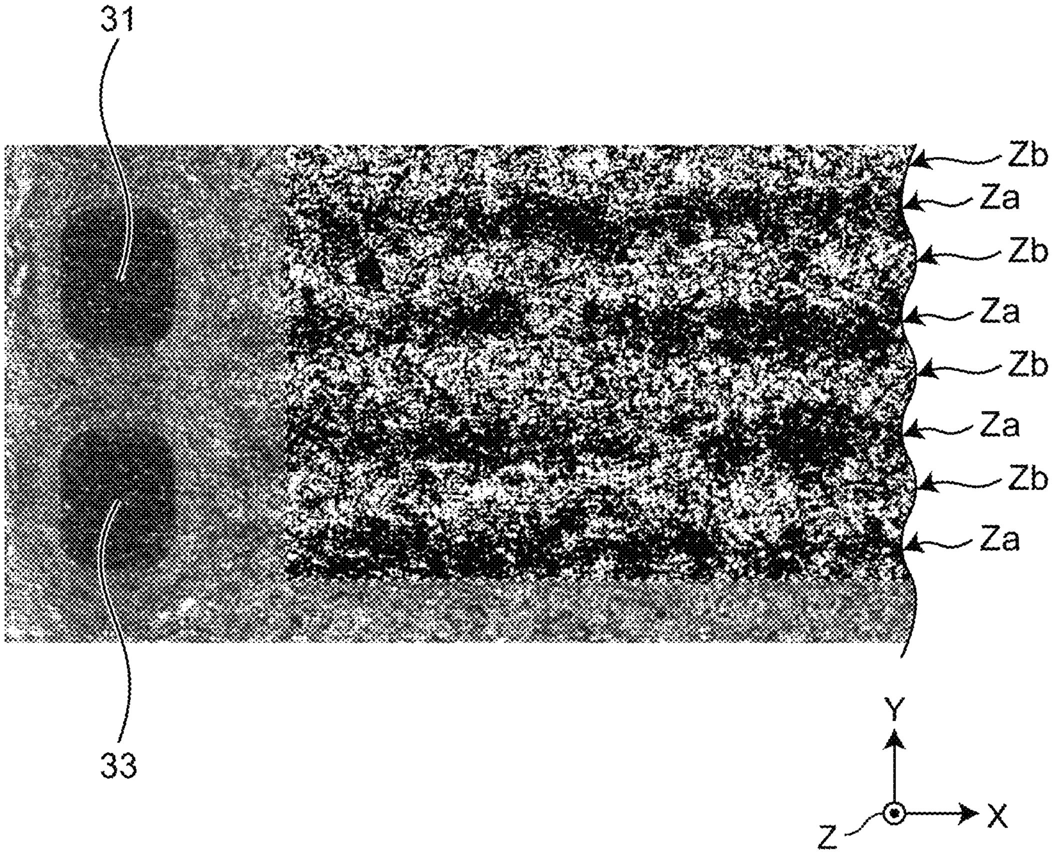
FIG. 8 is an image view acquired by imaging the inductor component from a horizontal direction and adjusting the brightness.

A differentiating method for the brightness and the darkness from each other will be described. As depicted in FIG. 7A, imaging is executed from the direction that intersects the main surface 12a of the second magnetic layer 12 at a right angle. For example, the imaging is executed using VHX-5000 manufactured by Keyence Corporation and under ring lighting. A predetermined region of the acquired image is selected and a brightness distribution in the predetermined region is drawn. The brightness distribution is set to have 255 gradations. Binarization is executed. The threshold value of the binarization is a range corresponding to a substantial half of 255. FIG. 8 depicts an image acquired in this manner. As depicted in FIG. 8, the portion directly on the bright region Zb looks bright. On the other hand, the portion directly on the dark region Za looks dark.

As depicted in FIG. 7A and FIG. 3, at least one of the component groups of the first and the second inductor wires 21 and 22, and the first to the third cylindrical wires 31 to 33 are in contact with the magnetic powder particles 100. According to this, the inductance acquisition efficiency can be improved by avoiding any unnecessary insulating part. When the plural magnetic powder particles 100 are electrically coupled in the Y-direction, the spacing between the different first and the second inductor wires 21 and 22, and the spacing between the turns of the same first inductor wire 21 (or the same second inductor wire 22) may each be short-circuited through the magnetic powder particles 100 while the long axis of each of the magnetic powder particles 100 included in the dark region Za present along the first and the second inductor wires 21 and 22 is disposed along the direction that substantially intersects the main surface 12a of the second magnetic layer 12 at a right angle and the short-circuiting is not likely to occur even when at least one of the component groups of the first and the second inductor wires 21 and 22, and the first to the third cylindrical wires 31 to 33 is in contact with the magnetic powder particles 100.

Figure 7B:
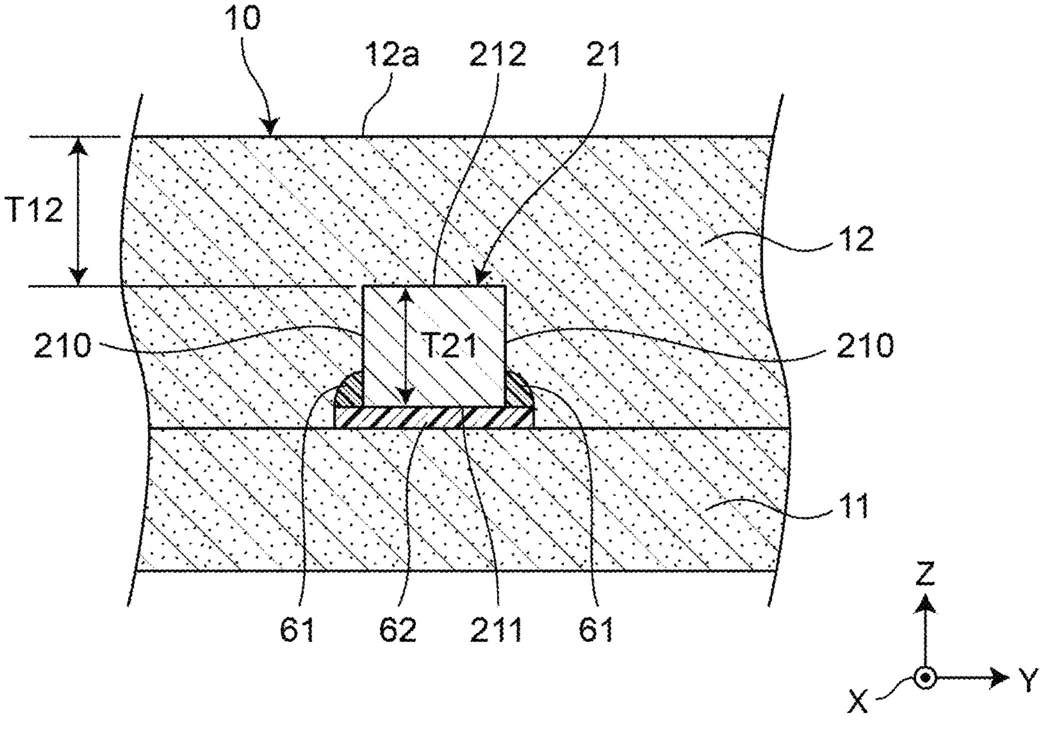
FIG. 7B is a simplified view of a cross-section intersecting the direction in which the first inductor wire of the inductor component extends, at a right angle.

FIG. 7B is a simplified view of a cross-section that is at the center in the direction in which the first inductor wire 21 extends and that intersects the direction in which the first inductor wire 21 extends, at a right angle. FIG. 7B does not depict the external terminals 41 to 43 and the covering film 50.

As depicted in FIG. 7B, a thickness T12 in the Z-direction of the second magnetic layer 12 between the main surface 12a of the second magnetic layer 12 and the top face 212 in the first direction of the first inductor wire 21 is equal to or smaller than a three-fold amount of the height T21 in the Z-direction of the first inductor wire 21. According to the above configuration, the dark region Za and the bright region Zb can easily be recognized on the main surface 12a of the second magnetic layer 12. When the thickness T12 of the second magnetic layer 12 is excessively large, the long axis of each of the magnetic powder particles 100 included in the vicinity of the main surface 12a of the second magnetic layer 12 is disposed in substantially parallel to the main surface 12a of the second magnetic layer 12 and the magnetic powder particles 100 included in the vicinity of the main surface 12a of the second magnetic layer 12 therefore reflect light. It is therefore difficult to clearly determine the dark region Za on the main surface 12a of the second magnetic layer 12.

As depicted in FIG. 7B, the first magnetic layer 11 has a flat plate-like shape. According to the above configuration, in the first magnetic layer 11, the fillability of the magnetic powder particles 100 does not need to be considered in relation to the first and the second inductor wires 21 and 22, and the material of the magnetic powder particles 100 can freely be selected. The degree of freedom of selecting the material of the magnetic powder particles 100 is improved. For example, the DC superimposition can be increased by using a metal magnetic material having not a flattened shape but a spherical shape as the magnetic powder particles 100. Magnetic powder particles each having a flattened shape and magnetic powder particles each having a spherical shape may concurrently be present mixed with each other as the magnetic powder particles 100. The strength and the magnetic permeability can be enhanced by using a rigid body such as ferrite or a metal foil as the magnetic powder particles 100. In the second magnetic layer 12, similarly, the magnetic powder particles each having a flattened shape and the magnetic powder particles each having a spherical shape may concurrently be present mixed with each other as the magnetic powder particles 100.

Figure 7C:
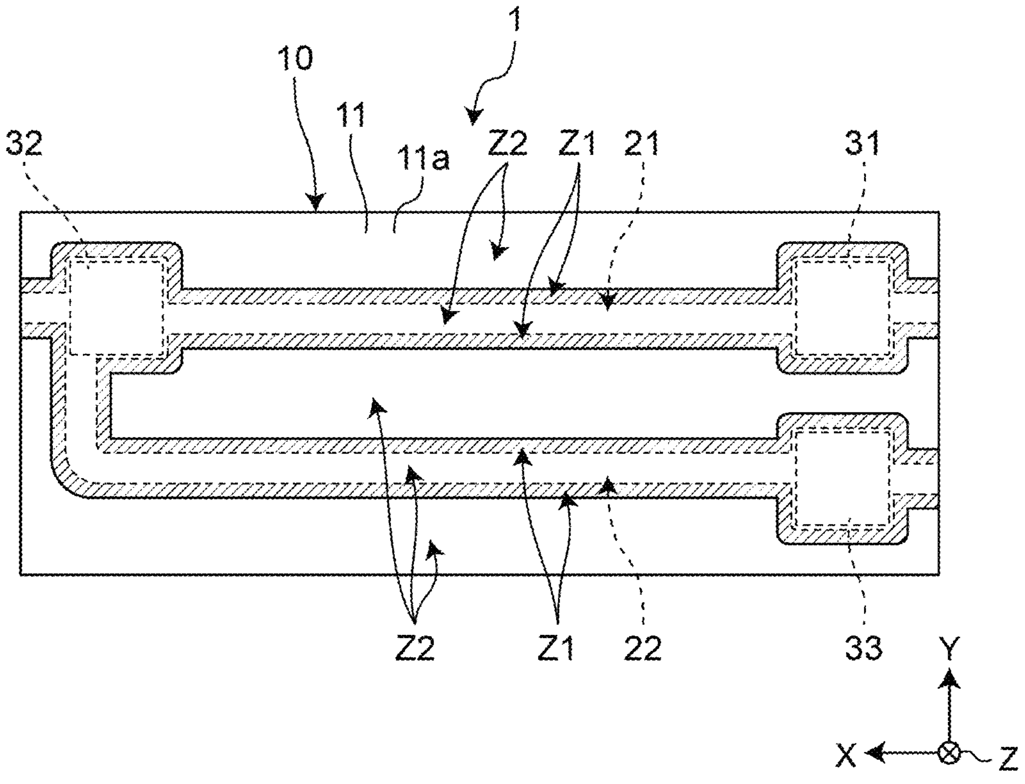
FIG. 7C is a bottom view of the inductor component.

FIG. 7C is a bottom view of the inductor component 1. As depicted in FIG. 7C, when the main surface 11a of the first magnetic layer 11 is seen from the direction intersecting the main surface 11a in the reverse Z-direction of the first magnetic layer 11 at a right angle, the first magnetic layer 11 includes a first region Z1 present along the first and the second inductor wires 21 and 22, and a second region Z2 that is a region other than the first region Z1 and that cannot be distinguished in brightness from the first region Z1. FIG. 7C depicts the first region Z1 by hatching. When the first region Z1 is seen from the direction intersecting the main surface 11a of the first magnetic layer 11 at a right angle, the first region Z1 overlaps on the dark region Za.

For example, the first region Z1 extends along the extension direction of the first and the second inductor wires 21 and 22 and, when the first region Z1 is seen from the direction intersecting the main surface 11a of the first magnetic layer 11 at a right angle, the first region Z1 is adjacent to the first and the second inductor wires 21 and 22. The difference between the brightness of the first region Z1 and the brightness of the second region Z2 does not need to be zero and some difference is permissible. The first region Z1 and the second region Z2 are set to be substantially indistinguishable in brightness from each other.

The long axis of each of the magnetic powder particles 100 included in the first magnetic layer 11 is disposed in substantially parallel to the main surface 11a of the first magnetic layer 11 and the magnetic powder particles 100 included in the first magnetic layer 11 consequently reflect light, and it is therefore difficult to clearly determine the first region Z1 and the second region Z2 on the main surface 11a of the first magnetic layer 11.

According to the above configuration, on the main surface 11a of the first magnetic layer 11, the portion directly on the first region Z1 and the portion directly on the second region Z2 look to have equal brightness. The top and the bottom of the inductor component 1 can easily be distinguished from each other from the outer appearance.

It is preferred that the dark region Za and the bright region Zb be indistinguishable through the covering film 50. According to the above configuration, at an outer appearance sorting step executed after the manufacture of the inductor component 1, over-sorting (excessive sorting) can be suppressed. For example, the covering film 50 is colored. For example, the color of the foundation layer can be set to be invisible by coloring the covering film 50 using a pigment such as, for example, titanium oxide or carbon black. It is preferred that the covering film 50 be epoxy, phenol, a liquid crystal polymer, an imide-based resin, or resin including a combination of the above, and the covering film 50 may include resin other than the above. The covering film 50 may have an inorganic filler mixed therein to impart insulation and rigidity like those of silica, to the covering film 50.

It is preferred that the external terminals 41 to 43 be disposed on the main surface 12*a* of the second magnetic layer 12, that the covering film 50 be disposed in a portion of the main surface 12*a* of the second magnetic layer 12 to expose the external terminals 41 to 43, and that the main surface 12*a* of the second magnetic layer 12 be the most outer surface of the base body 10. According to the above configuration, the manufacturing cost can be reduced by limiting the number of the layers that provide the functions to the fewest.

Manufacturing Method

A manufacturing method for the inductor component 1 will next be described. FIG. 9A to FIG. 9L each correspond to the cross-section taken along C-C in FIG. 1 (FIG. 2C).

Figure 9A:
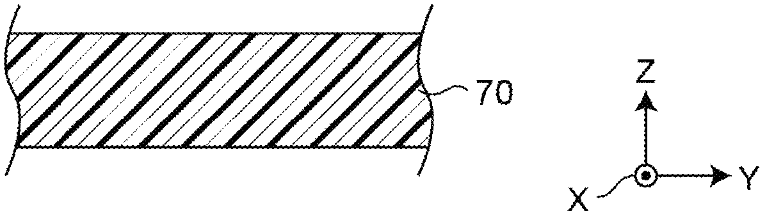
FIG. 9A is an explanatory view explaining a manufacturing method for an inductor component.

A base substrate 70 is prepared as depicted in FIG. 9A. The hardness of the base substrate 70 is higher than the hardness of the magnetic sheet that constitutes each of the first magnetic layer 11 and the second magnetic layer 12. The base substrate 70 includes, for example, a ceramic substrate of ferrite, alumina, or the like, or resin substrate of glass epoxy or the like.

Figure 9B:
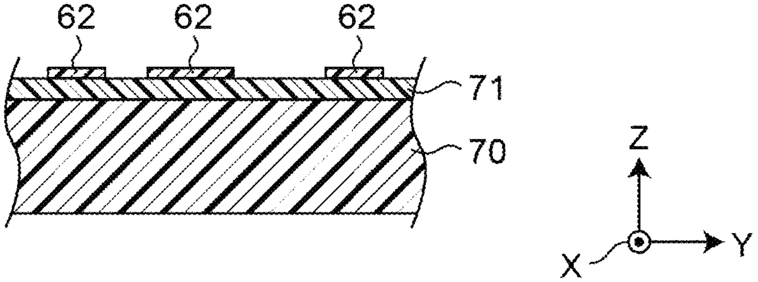
FIG. 9B is an explanatory view explaining the manufacturing method for an inductor component.

As depicted in FIG. 9B, a first insulating layer 71 is applied onto the main surface of the base substrate 70 and the first insulating layer 71 is hardened. A second insulating layer is further applied onto the first insulating layer 71 and a predetermined pattern is formed in the second insulating layer using a photolithography method to be hardened. The bottom face insulating part 62 is thereby formed.

Figure 9C:
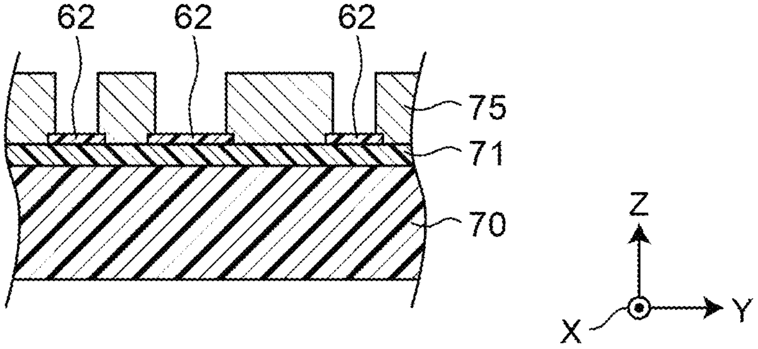
FIG. 9C is an explanatory view explaining the manufacturing method for an inductor component.

As depicted in FIG. 9C, a seed layer not depicted is formed on the first insulating layer 71 and the bottom face insulating part 62 using a known method such as a sputtering method or a vapor deposition method. A dry film resist (DFR) 75 is thereafter laminated and a predetermined pattern is formed in the DFR 75 using a photolithography method. The predetermined pattern is through holes that correspond to the positions to dispose the first inductor wire 21 and the second inductor wire 22 on the bottom face insulating part 62.

Figure 9D:
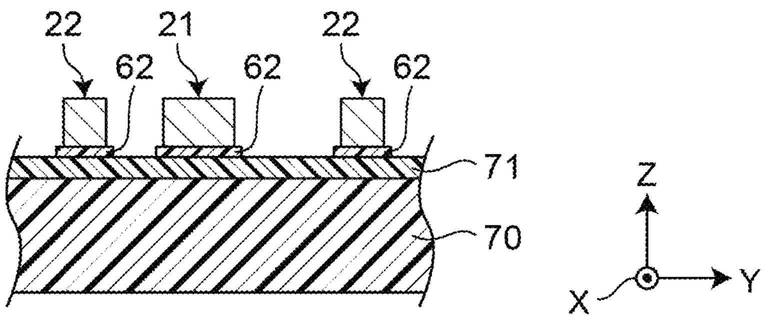
FIG. 9D is an explanatory view explaining the manufacturing method for an inductor component.

As depicted in FIG. 9D, the first inductor wire 21 and the second inductor wire 22 are formed on the bottom face insulating part 62 through the seed layer using electrolytic plating. The DFR 75 is thereafter peeled off and the seed layer is etched. In this manner, the first inductor wire 21 and the second inductor wire 22 are formed on the main surface of the base substrate 70.

Figure 9E:
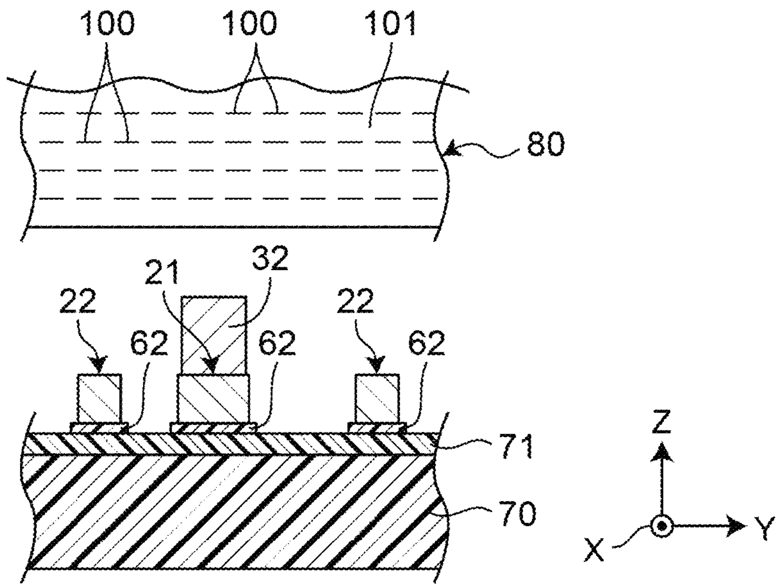
FIG. 9E is an explanatory view explaining the manufacturing method for an inductor component.

A DFR 75 is thereafter again laminated and a predetermined pattern is formed in this DFR 75 using a photolithography method. This predetermined pattern is through holes that correspond to the positions to dispose the first cylindrical wire 31, the second cylindrical wire 32, and the third cylindrical wire 33 on the first inductor wire 21 and the second inductor wire 22. As depicted in FIG. 9E, the first cylindrical wire 31, the second cylindrical wire 32, and the third cylindrical wire 33 are formed on the first inductor wire 21 and the second inductor wire 22 using electrolytic plating. The DFR 75 is thereafter peeled off. A seed layer is usable for the electrolytic plating and, in this case, the seed layer needs to be etched.

Figure 9F:
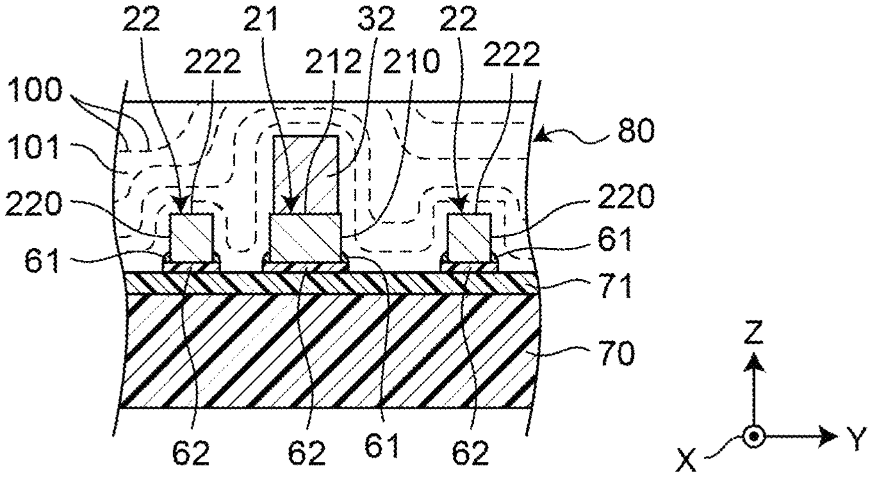
FIG. 9F is an explanatory view explaining the manufacturing method for an inductor component.

A magnetic sheet 80 including the magnetic powder particles 100 each having a flattened shape, and the resin 101 including the magnetic powder particles 100 is thereafter pressure-bonded from above of the main surface of the base substrate 70 toward the first inductor wire 21 and the second inductor wire 22 and, as depicted in FIG. 9F, the top face 212 and the side face 210 of the first inductor wire 21, and the top face 222 and the side face 220 of the second inductor wire 22 are covered by the magnetic sheet 80. The magnetic sheet 80 constitutes the second magnetic layer 12. At this time, the resin 101 included in the magnetic sheet 80 is concurrently pushed out from the magnetic sheet 80 to cover only a portion of the side face 210 of the first inductor wire 21 and only a portion of the side face 220 of the second inductor wire 22, to form the side face insulating part 61. In FIG. 9E and FIG. 9F, the magnetic powder particles 100 are each depicted by the long axis thereof.

As depicted in FIG. 9E, the long axes of the magnetic powder particles 100 in the magnetic sheet 80 are arranged along the horizontal direction (the Y-direction) before pressure-bonding the magnetic sheet 80 while, as depicted in FIG. 9F, when the magnetic sheet 80 is pressure-bonded, the long axes of the magnetic powder particles 100 are arranged along the direction in which the magnetic sheet 80 is deformed by the pushing force in the direction from above to underneath. At this time, because the hardness of the base substrate 70 is higher than the hardness of the magnetic sheet 80, when the magnetic sheet 80 is pressure-bonded to the first inductor wire 21 and the second inductor wire 22, the resin 101 included in the magnetic sheet 80 can effectively be pushed out to only the portion of the side face 210 of the first inductor wire 21 and only the portion of the side face 220 of the second inductor wire 22. The side face insulating part 61 can effectively be formed concurrently with the pressure-bonding of the magnetic sheet 80.

Looking thereafter at the magnetic sheet 80 from above of the magnetic sheet 80, whether the magnetic powder particles 100 fill the side face 210 of the first inductor wire 21 and the side face 220 of the second inductor wire 22 is determined using the brightness and the darkness to be checked. For example, looking at the magnetic sheet 80 from above of the magnetic sheet 80, the dark region Za is formed in the region present along the side face 210 of the first inductor wire 21 and the side face 220 of the second inductor wire 22 and the bright region Zb is formed in a region other than the dark region Za. According to this, whether the magnetic powder particles 100 fill the side face 210 of the first inductor wire 21 and the side face 220 of the second inductor wire 22 can easily be determined by looking at the magnetic sheet 80 from above of the magnetic sheet 80 and checking the darkness and the brightness. Any defective filling with the magnetic powder particles 100 can thereby be detected early in a non-destructive manner and in the manufacture stage of the inductor component 1, and the manufacturing loss of the product can be reduced.

Figure 9G:
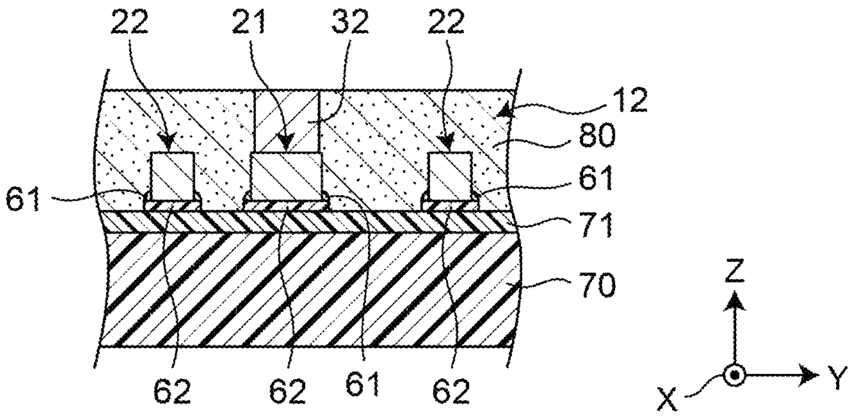
FIG. 9G an explanatory view explaining the manufacturing method for an inductor component.

As depicted in FIG. 9G, the magnetic sheet 80 is ground to form the second magnetic layer 12 and to expose the end faces of the first cylindrical wire 31, the second cylindrical wire 32, and the third cylindrical wire 33. The grinding step for the magnetic sheet 80 may be executed before the above checking step.

Figure 9H:
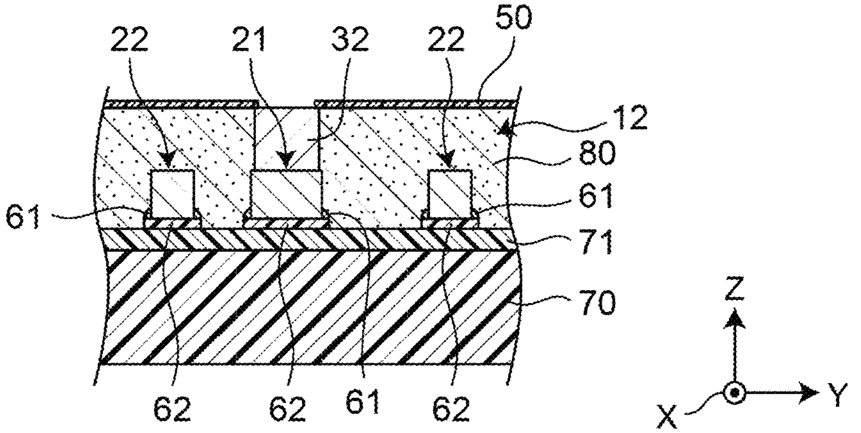
FIG. 9H is an explanatory view explaining the manufacturing method for an inductor component.

As depicted in FIG. 9H, a third insulating layer is thereafter applied onto the upper face of the second magnetic layer 12 and a predetermined pattern is formed in the third insulating layer using a photolithography step to be hardened to thereby form the covering film 50. The predetermined pattern is through holes that correspond to the positions to dispose the end faces of the cylindrical wires 31 to 33, and the first external terminal 41, the second external terminal 42, and the third external terminal 43 on the second magnetic layer 12.

Figure 9I:
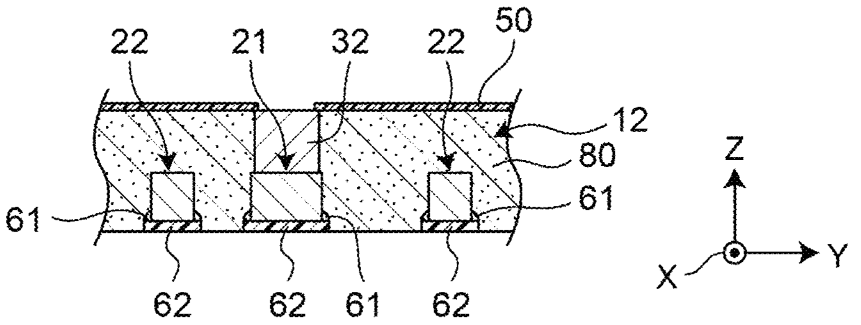
FIG. 9I is an explanatory view explaining the manufacturing method for an inductor component.

As depicted in FIG. 9I, the base substrate 70 and the first insulating layer 71 are removed by grinding. At this time, the first insulating layer 71 may be used as a peelable layer, and the base substrate 70 and the first insulating layer 71 may be removed by peeling.

Figure 9J:
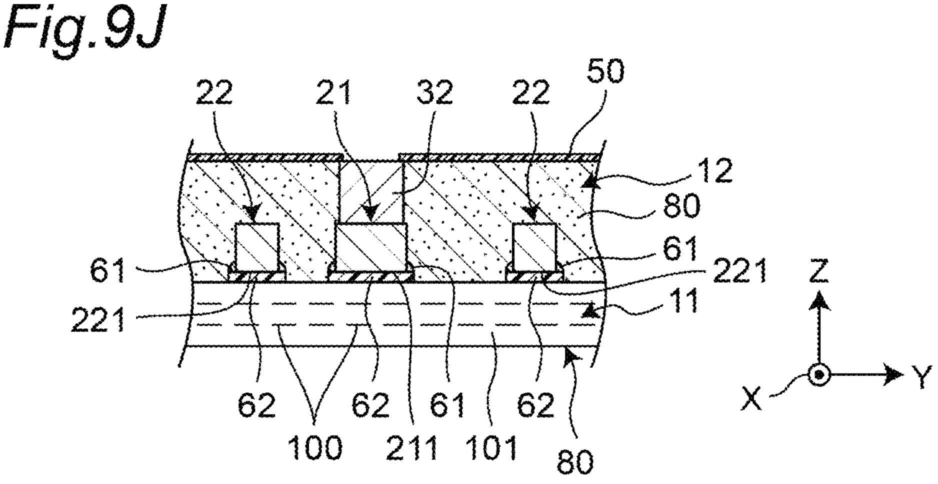
FIG. 9J is an explanatory view explaining the manufacturing method for an inductor component.

As depicted in FIG. 9J, another magnetic sheet 80 is thereafter pressure-bonded from underneath of the first inductor wire 21 and the second inductor wire 22 toward the first inductor wire 21 and the second inductor wire 22 to cover the bottom face 211 of the first inductor wire 21 and the bottom face 221 of the second inductor wire 22 with the other magnetic sheet 80. The other magnetic sheet 80 is ground to have a predetermined thickness to constitute the first magnetic layer 11. In FIG. 9J, the magnetic powder particles 100 are each depicted by the long axis thereof. Before and after the pressure-bonding the magnetic sheet 80, the long axes of the magnetic powder particles 100 of the magnetic sheet 80 are arranged along the horizontal direction (the Y-direction). As above, the first inductor wire 21 and the second inductor wire 22 can be sandwiched by and between the magnetic sheets 80 present thereon and therebeneath, and the inductance acquisition efficiency can be improved.

Figure 9K:
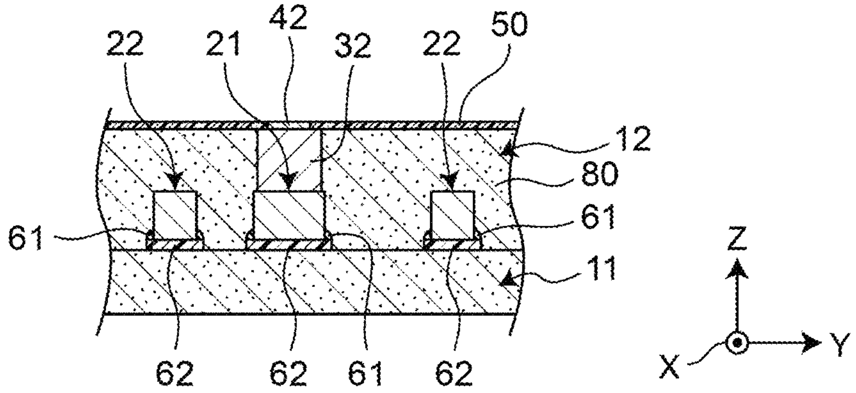
FIG. 9K is an explanatory view explaining the manufacturing method for an inductor component.

As depicted in FIG. 9K, a metal film to grow from the cylindrical wires 31 to 33 into the through holes of the covering film 50 is thereafter formed using non-electrolytic plating to form the first external terminal 41, the second external terminal 42, and the third external terminal 43.

Figure 9L:
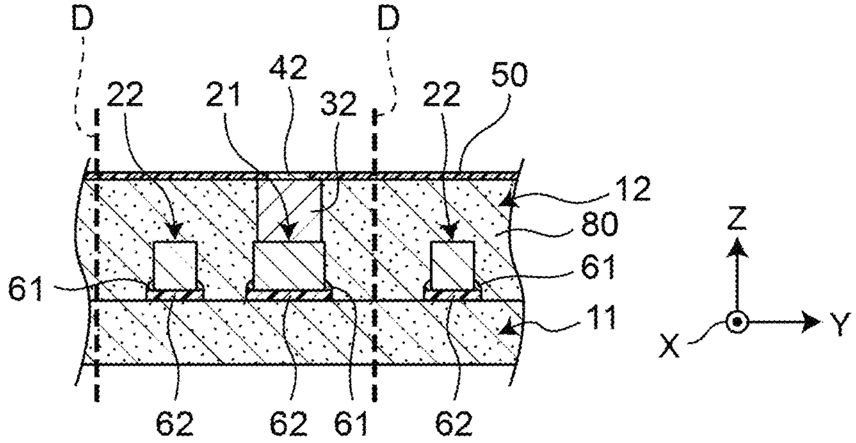
FIG. 9L an explanatory view explaining the manufacturing method. for an inductor component.

As depicted in FIG. 9L, the inductor component 1 is thereafter individuated at a cutting line D and, as depicted in FIG. 2C, the inductor component 1 is manufacture.

Second Embodiment

Figure 10:
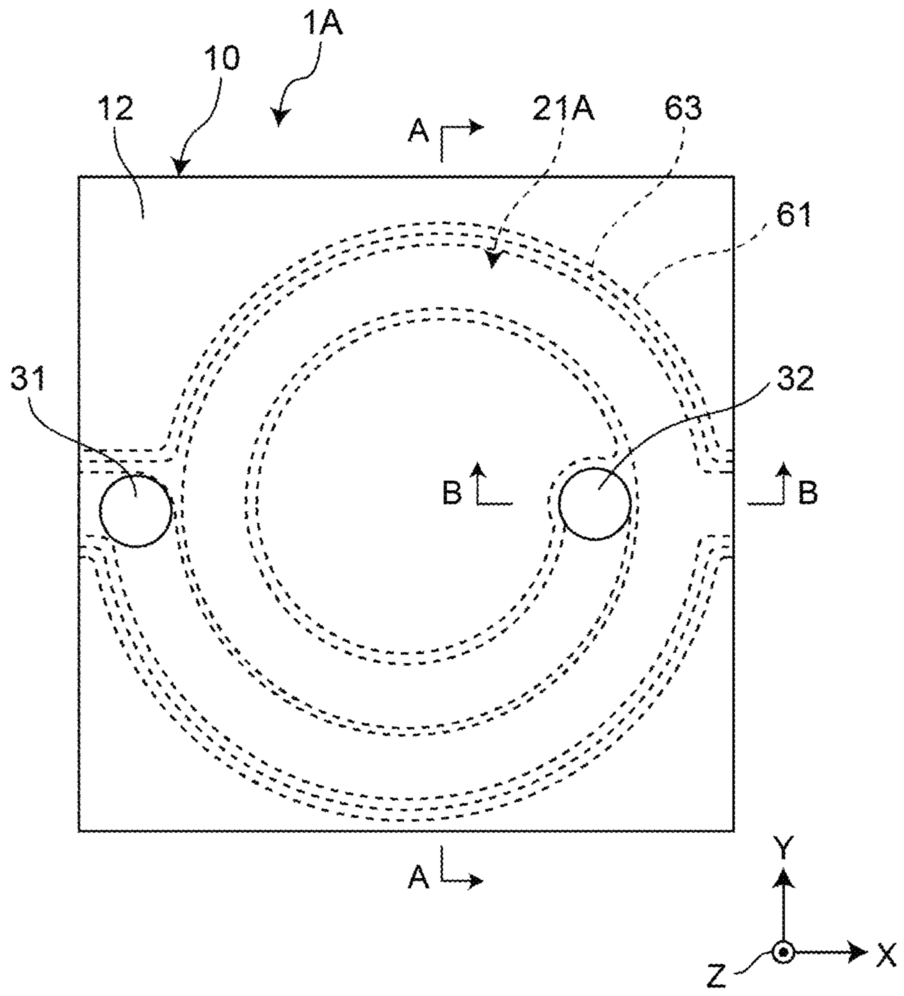
FIG. 10 is a plan view depicting a second embodiment of the inductor component.
Figure 11A:
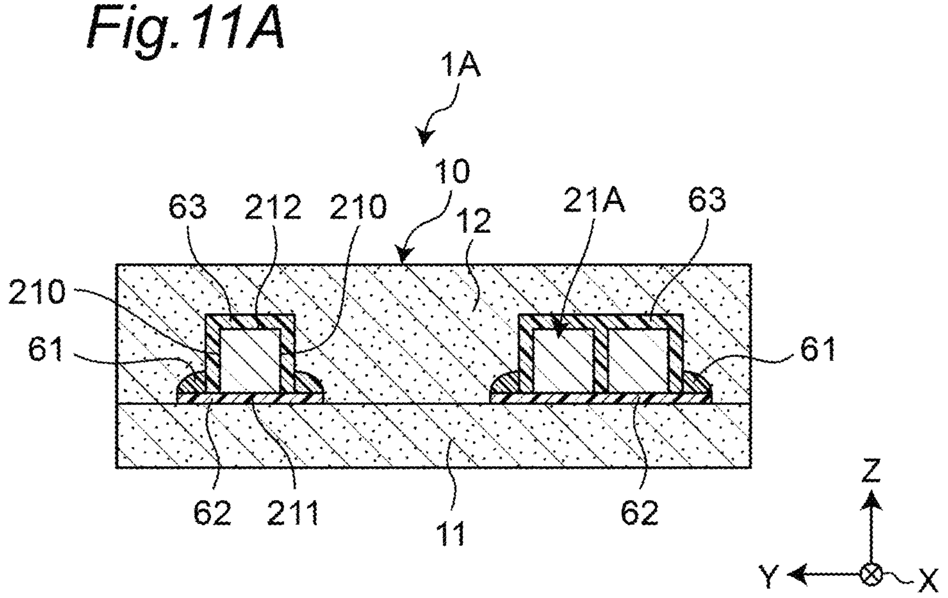
FIG. 11A is a cross-sectional view taken along A-A in FIG. 10.
Figure 11B:
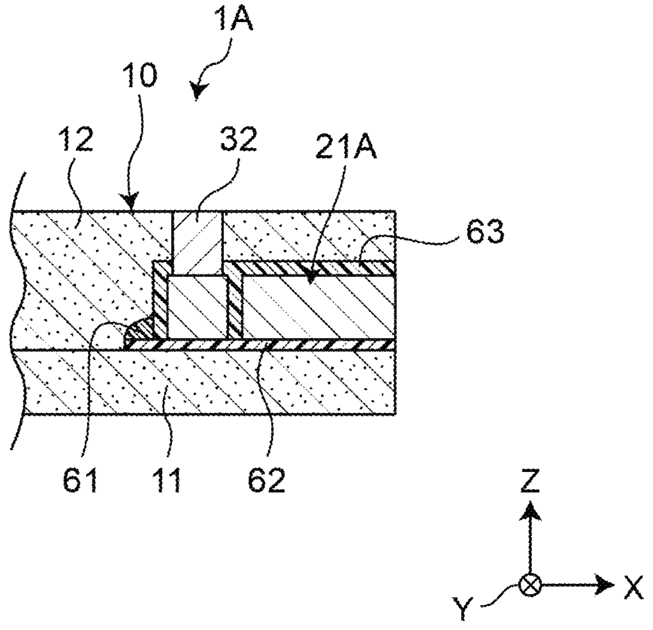
FIG. 11B is a cross-sectional view taken along B-B in FIG. 10.

FIG. 10 is a plan view depicting a second embodiment of an inductor component 1A. FIG. 11A is a cross-sectional view taken along A-A in FIG. 10. FIG. 11B is a cross-sectional view taken along B-B in FIG. 10. The second embodiment differs from the first embodiment in the configurations of the inductor wires and the insulating parts. The different configuration will be described below. The other structures are same as those of the first embodiment, are therefore given the same reference numerals as those in the first embodiment, and will not again be described.

As depicted in FIG. 10, FIG. 11A, and FIG. 11B, the inductor component 1A of a second embodiment includes one inductor wire 21A. The inductor wire 21A is formed on the upper side of the first magnetic layer 11, that is, for example, only on the bottom face insulating part 62 disposed on the upper face of the first magnetic layer 11, and is a wire spirally extending along the upper face of the first magnetic layer 11. The inductor wire 21A has a spiral shape whose number of turns exceeds one. The inductor wire 21A is spirally wound clockwise from an inner circumferential end toward the outer circumferential end when the inductor wire 21A is seen from the upper side. The outer circumferential end of the inductor wire 21A is connected to the first cylindrical wire 31 and the inner circumferential end of the inductor wire 21A is connected to the second cylindrical wire 32. In the drawings, the covering film and the external terminals are not depicted.

The inductor component 1A further includes a circumferential face insulating part 63 in contact with the side face 210 and the top face 212 of the inductor wire 21A. The circumferential face insulating part 63 is present between the side face insulating part 61 and a portion of the side face 210 of the inductor wire 21A, and the side face insulating part 61 covers together with the circumferential face insulating part 63 only a portion of the side face 210 of the inductor wire 21A.

The composition of the circumferential face insulating part 63 differs from the composition of the side face insulating part 61 and the composition of the bottom face insulating part 62. For example, the resin of the circumferential face insulating part 63 differs from the resin of the side face insulating part 61 and the resin of the bottom face insulating part 62. According to this, the design scope of each of the circumferential face insulating part 63, the side face insulating part 61, and the bottom face insulating part 62 is expanded.

The thickness of the side face insulating part 61 is larger than the thickness of the circumferential face insulating part 63. The thickness refers to the maximal value that is measured in a cross-section that intersects the direction in which the inductor wire 21A extends, at a right angle. According to this, the insulation can further be improved.

Figure 12:
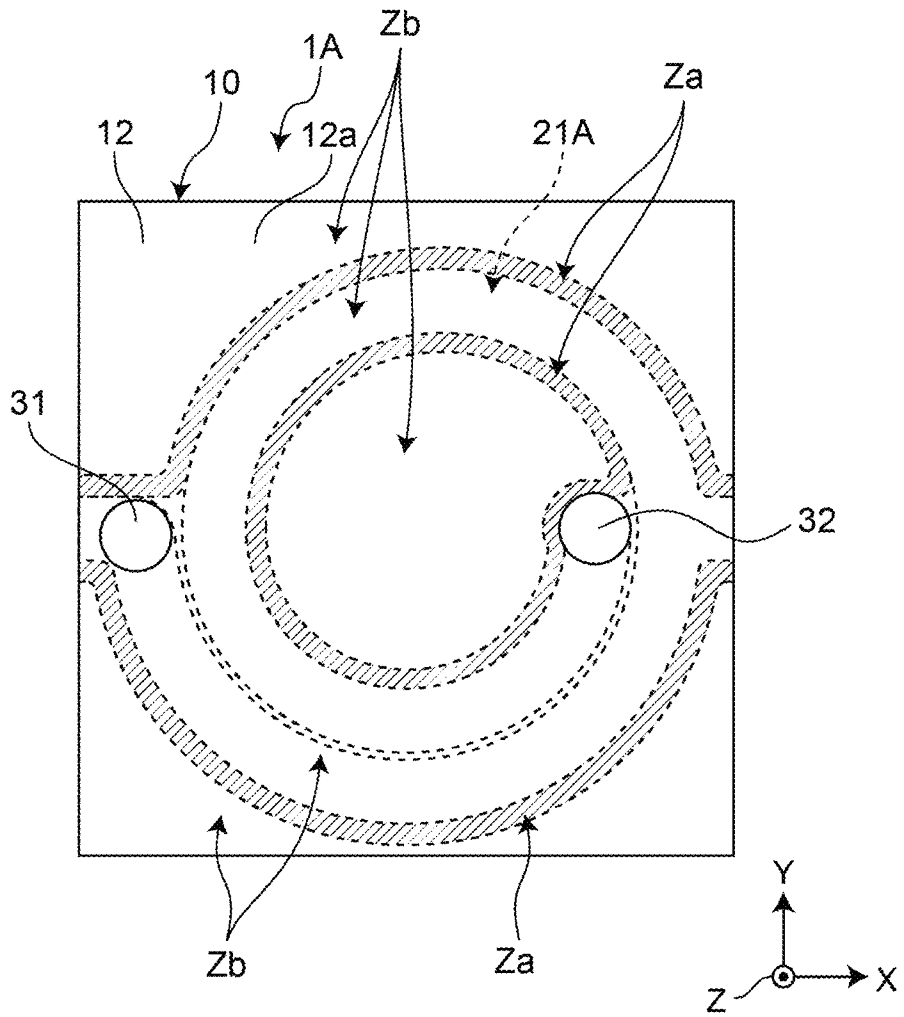
FIG. 12 is a plan view of the inductor component.

FIG. 12 is a plan view of the inductor component 1A. FIG. 12 does not depict the covering film and the external terminals.

As depicted in FIG. 12, when the main surface 12*a* of the second magnetic layer 12 is seen from the direction that intersects the main surface 12*a* of the second magnetic layer 12 at a right angle, the second magnetic layer 12 includes the dark region Za present along the inductor wire 21A, and the bright region Zb that is the region other than the dark region Za and whose brightness is higher than that of the dark region Za. For example, the dark region Za extends along the extension direction of the inductor wire 21A and, when the dark region Za is seen from the direction that intersects the main surface 12*a* of the second magnetic layer 12 at a right angle, the dark region Za is adjacent to the inductor wire 21A. The spacing between adjacent turns of the inductor wire 21A includes the bright region Zb. The dark region Za is disposed along the inner circumferential face and the outer circumferential face of the inductor wire 21A.

According to the above configuration, when the second magnetic layer 12 is seen from the direction that intersects the main surface 12*a* of the second magnetic layer 12 at a right angle, the second magnetic layer 12 includes the dark region Za present along the inductor wire 21A, and the bright region Zb that is the region other than the dark region Za and, on the main surface 12*a* of the second magnetic layer 12, the portion directly on the bright region Zb looks bright and the portion directly on the dark region Za looks dark. It can thereby be recognized that the magnetic powder particles 100 included in the second magnetic layer 12 are in the desired disposition when the second magnetic layer 12 is pressure-bonded to the inductor wire 21A to be manufactured. Any defective filling with the magnetic powder particles 100 can therefore be detected early in a non-destructive manner and the manufacturing loss of the product can be reduced.

Third Embodiment

Figure 13A:
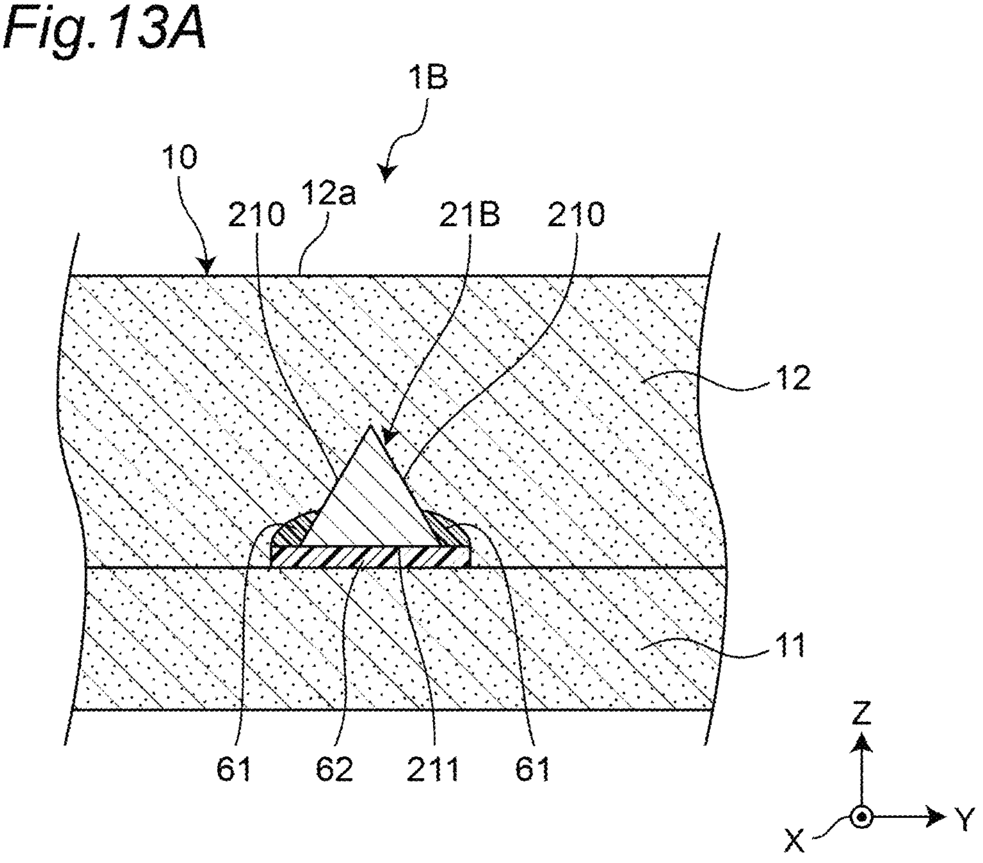
FIG. 13A is a cross-sectional view depicting a third embodiment of the inductor component.

FIG. 13A is a cross-sectional view depicting a third embodiment of an inductor component 1B. The third embodiment differs from the first embodiment in the configuration of the inductor wire. The different configuration will be described below. The other structures are same as those of the first embodiment, are therefore given the same reference numerals as those in the first embodiment, and will not again be described.

FIG. 13A is a simplified view of a cross-section that is at the center in the direction in which a first inductor wire 21B extends and that intersects the direction in which the first inductor wire 21B extends, at a right angle. FIG. 13A does not depict the external terminals and the covering film.

As depicted in FIG. 13A, the first inductor wire 21B is formed in a triangle in a cross-section intersecting the extension direction at a right angle. The first inductor wire 21B includes the first side face 210 facing in the forward Y-direction, the second side face 210 facing in the reverse Y-direction, and the bottom face 211 facing in the reverse Z-direction. The side face 210 corresponds to the oblique side of the triangle. Though not depicted, the second inductor wire also has the same configuration.

Figure 13B:
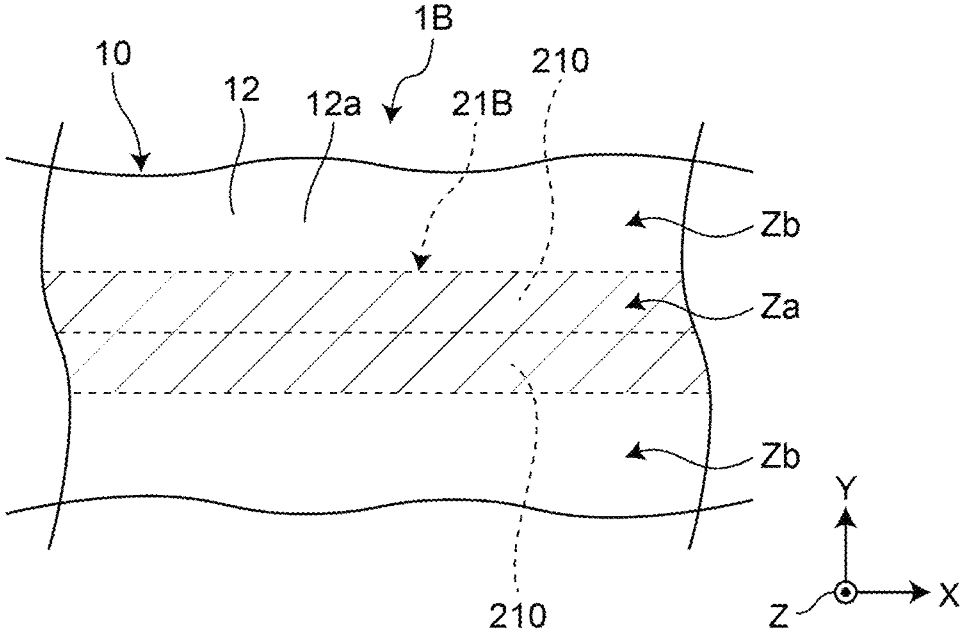
FIG. 13B is a plan view of the inductor component.

FIG. 13B is a plan view of the inductor component. FIG. 13B does not depict the external terminals and the covering film.

As depicted in FIG. 13B, when the main surface 12*a* of the second magnetic layer 12 is seen from the direction that intersects the main surface 12*a* of the second magnetic layer 12 at a right angle, the second magnetic layer 12 includes the dark region Za present along the first inductor wire 21B and the bright region Zb that is the region other than the dark region Za and whose brightness is higher than that of the dark region Za. For example, the dark region Za extends along the extension direction of the first inductor wire 21B and, when the dark region Za is seen from the direction intersecting the main surface 12*a* of the second magnetic layer 12 at a right angle, the dark region Za overlaps on at least a portion of the (in this embodiment, overall) first inductor wire 21B. The long axes of the magnetic powder particles 100 included in the region present along the side face 210 are disposed along the side face 210 that is oblique relative to the horizontal direction (the Y-direction), and the magnetic powder particles 100 included in this region tend to avoid reflecting light and this region becomes the dark region Za.

The present disclosure is not limited to the above embodiments, and design changes can be made thereto within the scope not departing from the gist of the present disclosure. For example, the feature points of each of the first to the third embodiments may variously be combined.

In the first to the third embodiments, the number of the layers of the inductor wire is one layer while a multilayer configuration including two layers or more may be employed. Plural inductor wires may be disposed along the forward Z-direction and, in this case, the dark region is a region present along the inductor wire positioned on the outermost side in the forward Z-direction. According to the above configuration, the influence on the mounting area can be reduced by laminating the inductor wires on each other. When the laminated inductor wires are connected to each other in series, the inductance can be enhanced.

The two of the first inductor wire and the second inductor wire are disposed in the base body in the first embodiment while three or more inductor wires may be disposed and, in this case, the number of each of the external terminals and the cylindrical wires is four or more.

In the first and the second embodiments, the "inductor wire" generates a magnetic flux in the magnetic layer in the case where an electric current flows therethrough, and thereby imparts inductance to the inductor component. The structure, the shape, the material, and the like thereof are therefore not especially limited. Especially, the wire shape is not limited to a straight line extending on a plane or a curved line (a spiral=a two-dimensional curved line) as those in the embodiments, and various known wire shapes such as a meandering wire are each usable.

The side face insulating parts, the bottom face insulating parts, and the circumferential face insulating part are disposed in the first to the third embodiments while at least one of these insulating parts may be disposed or none of these insulating parts may be disposed.

What is claimed is:

1. An inductor component comprising:

a base body including a first magnetic layer and a second magnetic layer laminated in order along a first direction; and an inductor wire disposed between the first magnetic layer and the second magnetic layer and on a plane orthogonal to the first direction, the second magnetic layer includes flat-shaped magnetic powder particles and resin containing the flat-shaped magnetic powder particles, the first magnetic layer is present in a reverse direction to a first direction of the inductor wire, the second magnetic layer is present in the first direction of the inductor wire and in a direction that is orthogonal to the first direction, when a main surface of the second magnetic layer is viewed from a direction which is orthogonal to the main surface of the second magnetic layer in the first direction, the second magnetic layer includes a dark region corresponding to the inductor wire and a bright region that is a region other than the dark region and whose brightness is higher than that of the dark region, and the main surface of the second magnetic layer is flat.

2. The inductor component according to claim 1, wherein a thickness of the second magnetic layer in the first direction between the main surface of the second magnetic layer and a top face of the inductor wire in the first direction is equal to or smaller than a three-fold amount of a height of the inductor wire in the first direction.

3. The inductor component according to claim 2, wherein the base body further comprises a covering film that covers the main surface of the second magnetic layer, and the dark region and the bright region are indistinguishable from each other through the covering film.

4. The inductor component according to claim 1, wherein the base body further comprises a covering film that covers the main surface of the second magnetic layer, and the dark region and the bright region are indistinguishable from each other through the covering film.

5. The inductor component according to claim 4, further comprising:

an external terminal disposed on the main surface of the second magnetic layer and electrically connected to the inductor wire, wherein the covering film is disposed on a portion of the main surface of the second magnetic layer to expose the external terminal, and a main surface of the first magnetic layer in a reverse direction to the first direction is an outermost face of the base body.

6. The inductor component according to claim 1, wherein the first magnetic layer has a flat plate-like shape.

7. The inductor component according to claim 6, wherein when the main surface of the first magnetic layer is seen from a direction that is orthogonal to the main surface of the first magnetic layer in the reverse direction to the first direction, the first magnetic layer includes a first region corresponding to the inductor wire, and a second region that is a region other than the first region and that is indistinguishable in brightness from the first region.

8. The inductor component according to claim 1, further comprising:

a cylindrical wire connected to the inductor wire, the cylindrical wire extending in the first direction to penetrate the second magnetic layer.

9. The inductor component according to claim 8, wherein at least one of the inductor wire and the cylindrical wire is in contact with the magnetic powder particles.

10. The inductor component according to claim 1, wherein the inductor wire includes a side face that faces in a direction orthogonal to the first direction, and the inductor component further comprises a side face insulating part that covers only a portion of the side face.

11. The inductor component according to claim 10, wherein the inductor wire includes a bottom face that faces in a reverse direction to the first direction, and the inductor component further comprises a bottom face insulating part in contact with the bottom face.

12. The inductor component according to claim 11, wherein the inductor wire includes a top face that faces in the first direction, the inductor component further comprises a circumferential face insulating part in contact with the side face and the top face, a composition of the circumferential face insulating part differs from a composition of the side face insulating part and from a composition of the bottom face insulating part, and a thickness of the side face insulating part is larger than a thickness of the circumferential face insulating part.

13. The inductor component according to claim 10, wherein a height of the side face insulating part in the first direction is equal to or smaller than one half of a height of the inductor wire in the first direction.

14. The inductor component according to claim 1, wherein the inductor wire includes a side face that faces in a direction orthogonal to the first direction, in a cross-section in a direction orthogonal to an extending direction of the inductor wire, the second magnetic layer includes a side face nearby region that is present between the side face of the inductor wire and a position distant from the side face by a predetermined distance in the direction orthogonal to the first direction, and an angle defined by a long axis of each of the flat-shaped magnetic powder particles contained in the side face nearby region with respect to the side face is equal to or smaller than 45°.

15. The inductor component according to claim 1, wherein the inductor wire includes a side face that faces in the direction orthogonal to the first direction, and in a cross-section in the direction orthogonal to an extending direction of the inductor wire, an angle defined at a point by the long axis of each of the flat-shaped magnetic powder particles contained in the second magnetic layer with respect to the side face becomes larger as the point becomes more distant from the side face of the inductor wire in the direction orthogonal to the first direction.

16. The inductor component according to claim 1, wherein the first magnetic layer contains flat shaped magnetic powder particles, the inductor wire includes a bottom face that faces in a reverse direction to the first direction, and in a cross-section in the direction orthogonal to an extending direction of the inductor wire, an angle defined by a long axis of each of the flat shaped magnetic powder particles contained in the first magnetic layer with respect to the bottom face is equal to or smaller than 45°.

17. The inductor component according to claim 1, wherein in a cross-section that is at a center in an extending direction of the inductor wire and in the direction orthogonal to the extending direction of the inductor wire, denoting a maximum Ferret length of each of the magnetic powder particles as "LF" and denoting a thickness intersecting the maximum Ferret length of each of the magnetic powder particles at a right angle as "TF", LF/TF is LF/TF≥10 and D90 of the maximum Ferret length is equal to or smaller than 100 μm.

18. The inductor component according to claim 1, wherein in each of the first magnetic layer and the second magnetic layer, a void rate is from 1 vol % to 10 vol %.

19. The inductor component according to claim 1, wherein a plurality of inductor wires are disposed along the first direction, and the dark region is a region corresponding to the inductor wire positioned on an outermost side in the first direction.

* * * * *